(12) United States Patent
Kim et al.

(10) Patent No.: US 10,414,328 B2
(45) Date of Patent: Sep. 17, 2019

(54) LAMP FOR VEHICLE AND VEHICLE COMPRISING THE SAME

(71) Applicant: LG Electronics Inc., Seoul (KR)

(72) Inventors: Cheolmun Kim, Seoul (KR); Seongju Ha, Seoul (KR); Kihoon Han, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/855,685

(22) Filed: Dec. 27, 2017

(65) Prior Publication Data

US 2019/0054851 A1 Feb. 21, 2019

(30) Foreign Application Priority Data

Aug. 16, 2017 (KR) .................. 10-2017-0103750

(51) Int. Cl.
| | | |
|---|---|---|
| *B60Q 1/00* | (2006.01) | |
| *B60Q 1/14* | (2006.01) | |
| *F21S 41/16* | (2018.01) | |
| *B60Q 11/00* | (2006.01) | |
| *F21S 45/70* | (2018.01) | |

(52) U.S. Cl.
CPC .......... *B60Q 1/1492* (2013.01); *B60Q 1/143* (2013.01); *B60Q 11/005* (2013.01); *F21S 41/16* (2018.01); *F21S 45/70* (2018.01); *B60Q 2300/114* (2013.01); *B60Q 2300/132* (2013.01); *B60Q 2300/45* (2013.01)

(58) Field of Classification Search
CPC ....... F21S 41/16; B60Q 1/1492; B60Q 1/143; B60Q 2300/114; B60Q 2300/45
See application file for complete search history.

(56) References Cited

U.S. PATENT DOCUMENTS

| | | | |
|---|---|---|---|
| 2002/0039336 A1* | 4/2002 | Mochizuki ............. | G11B 19/20 369/53.18 |
| 2011/0007299 A1* | 1/2011 | Moench ................. | G01P 3/366 356/3 |
| 2017/0330464 A1* | 11/2017 | Yoo ......................... | B60Q 1/30 |
| 2018/0079359 A1* | 3/2018 | Park ...................... | B60W 30/08 |
| 2018/0118095 A1* | 5/2018 | Kunii ..................... | B60Q 1/26 |

FOREIGN PATENT DOCUMENTS

| | | |
|---|---|---|
| JP | H05-034042 U | 5/1993 |
| JP | 2012-006493 | 1/2012 |
| JP | 2016-150668 | 8/2016 |
| JP | 2017-043138 | 3/2017 |
| KR | 10-2012-0016323 | 2/2012 |
| KR | 10-2017-00705066 | 6/2017 |

* cited by examiner

*Primary Examiner* — Ali Alavi
(74) *Attorney, Agent, or Firm* — Fish & Richardson P.C.

(57) ABSTRACT

A lamp for a vehicle includes a laser diode configured to output light, an interface configured to communicate with a brake device of the vehicle, and at least one processor coupled to the interface and configured to receive brake operation information from the brake device via the interface, and control a light output of the laser diode based on the brake operation information.

19 Claims, 21 Drawing Sheets

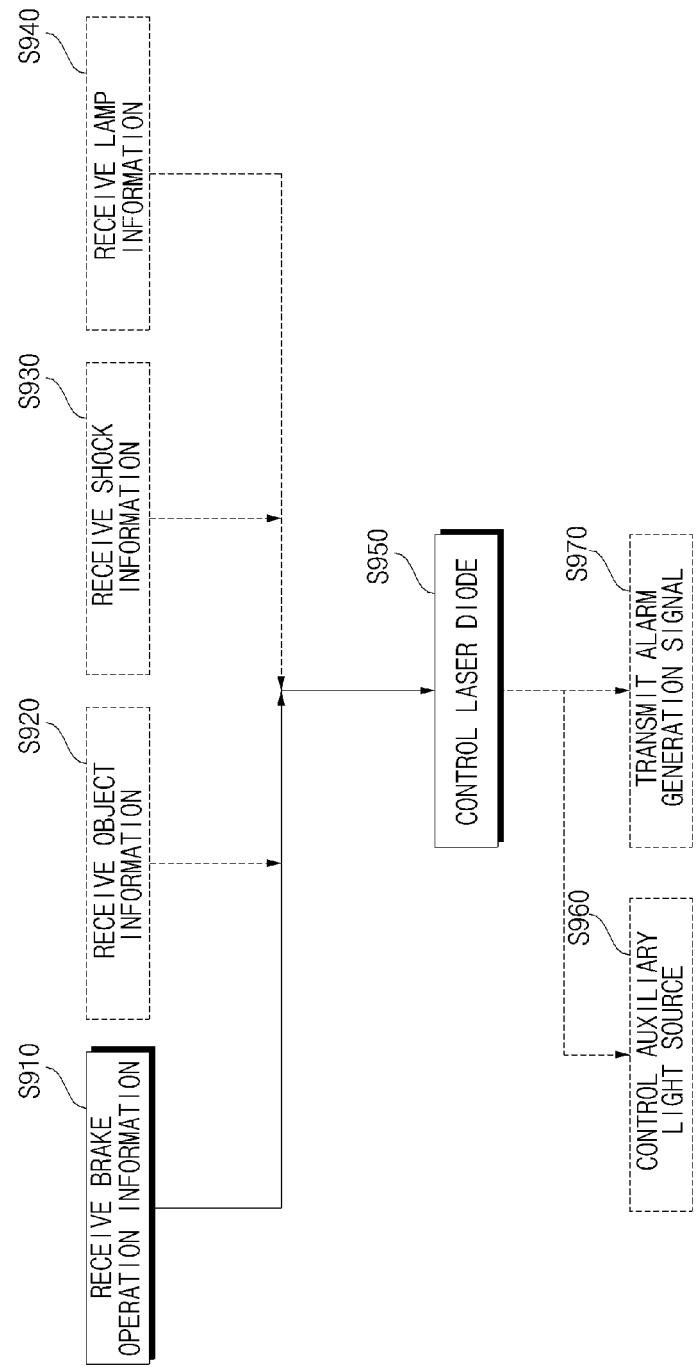

LAMP FOR VEHICLE AND VEHICLE COMPRISING THE SAME

CROSS-REFERENCE TO RELATED APPLICATION

This application claims the priority benefit of Korean Patent Application No. 10-2017-0103750, filed on Aug. 16, 2017, in the Korean Intellectual Property Office, the disclosure of which is incorporated herein by reference.

FIELD

The present disclosure relates to a lamp for a vehicle having a laser light source.

BACKGROUND

A vehicle is a device that can carry a passenger in a passenger-intended direction. A car is an example of the vehicle.

To increase the convenience of vehicle users, a vehicle may be equipped with various sensors, electronic devices and the like. For example, an Advanced Driver Assistance System (ADAS) and an autonomous vehicle are under active study to increase the driving convenience of users.

Recently, the use of a laser light source in a vehicle has become important. For example, a laser light source may have a size smaller than that of a conventional light source such as a light emitting diode (LED), and may have a high utilization efficiency and an increased density of light output from a lamp with the laser light source.

A laser diode (LD) used for a vehicle headlamp may emit light of several watts, but human or animal eyes may be seriously damaged even if they are exposed to a laser of only 2 mW or so. Therefore, in order to protect eyes of people and other living objects, a lamp for a vehicle may not directly radiate a laser beam, but converts the laser and uses the converted laser beam. For example, a headlamp using a laser light source may convert blue light into white light using an intermediate medium including phosphors when in use.

However, when the laser lamp is damaged due to, for example, an impact from an accident, the laser beam may be directly exposed to an outside of the lamp.

SUMMARY

One object of the present disclosure is to provide a safe control of a laser lamp before an accident occurs, in order to prevent a laser beam, which may very harmful to a visual system of a living object, from being discharged to an outside of the lamp.

Another object of the present disclosure is to provide a safe control of a laser lamp before an accident occurs and to secure the driver's view effectively.

Another object of the present disclosure is to enable a laser lamp to be used safely and effectively through control after the laser lamp is controlled so as to be turned off.

Another object of the present disclosure is to minimize the inconvenience of a user (e.g., a driver) while safely controlling a laser lamp.

The objects of the present disclosure are not limited to the objects as mentioned above, and other unmentioned objects will be clearly understood by those skilled in the art from the following description.

According to one aspect of the subject matter described in this application, a lamp for a vehicle includes a laser diode configured to output light, an interface configured to communicate with a brake device of the vehicle, and at least one processor coupled to the interface and configured to receive brake operation information from the brake device via the interface, and to control a light output of the laser diode based on the brake operation information.

Implementations according to this aspect may include one or more of following features. For example, the at least one processor may be further configured to, based on the brake operation information, determine whether the brake device has performed a full braking operation, and, based on a determination that the brake device has performed the full braking operation, control the laser diode to reduce an output of the light output. The at least one processor may be further configured to: based on the brake operation information, determine whether a braking operation is performed with a braking level that is greater than or equal to a threshold level; and based on a determination that the braking operation is performed with the braking level that is greater than or equal to the threshold level, control the laser diode to dim the light output.

In some implementations, the at least one processor may be further configured to receive object information from an object detection device via the interface, and control the light output of the laser diode based on the object information. The object information includes an estimated time to collision (TTC) between the vehicle and an object, and the at least one processor may be further configured to control the light output of the laser diode based on the TTC. The at least one processor may be further configured to control the laser diode to reduce the light output within the TTC.

In some implementations, the at least one processor may be further configured to control the laser diode to turn off the light output after reducing the light output within the TTC. The object information may include information about whether an object is a living object, and the at least one processor may be further configured to control the light output of the laser diode based on whether the object is the living object.

In some implementations, the vehicle may further include an autonomous emergency braking system (AEBS), and the at least one processor may be further configured to reduce the light output of the laser diode based on the brake operation information received from the AEBS. The vehicle may further include a sensing unit coupled to the interface and configured to sense vehicle shock information. The at least one processor may be further configured to receive the vehicle shock information from the sensing unit via the interface, and control the light output of the laser diode based on the vehicle shock information.

In some implementations, the vehicle shock information may include vehicle shock position information corresponding to a position at which a vehicle has received a shock, and the at least one processor may be further configured to control the light output of the laser diode based on the vehicle shock position information. In some examples, the at least one processor may be further configured, based on the laser diode being in a turned off state, determine whether the vehicle has received a shock based on the vehicle shock information, and to control the laser diode to be turned on based on a determination that the vehicle received no shock.

In some examples, the vehicle may further include a sensing unit coupled to the interface, and the at least one processor may be further configured to receive lamp information from the sensing unit via the interface, and to control the light output of the laser diode based on the lamp information. In some examples, the sensing unit may include a camera configured to capture light emitted from the lamp. In this case, the lamp information may include information about a state of light output that is emitted from the lamp and captured by the camera of the sensing unit, and the at least one processor may be further configured to control the light output of the laser diode based on the information about the state of light output.

In some implementations, the at least one processor may be further configured to determine whether a detected pattern of light emitted from the lamp corresponds to an expected pattern of light based on a control signal produced by the at least one processor, and to control the laser diode to reduce the light output based on a determination that the detected pattern of light emitted from the lamp deviates from the expected pattern of light.

In some examples, the at least one processor may be further configured to determine whether a detected variation in an output of light emitted from the lamp corresponds to an expected variation in the output of light based on a control signal produced by the at least one processor, and to control the laser diode to reduce the light output based on a determination that the detected variation in the output of light emitted from the lamp deviates from the expected variation in the output of light.

In some implementations, the laser diode may include a plurality of laser diodes in which each laser diode is configured to output light. The at least one processor may be further configured to, based on the brake operation information, control a first laser diode among the plurality of laser diodes differently from a second laser diode among the plurality of laser diodes.

In some implementations, the at least one processor may be further configured to control the interface to transmit a signal to an output unit of the vehicle, the output unit being configured to, in response to reception of the signal from the at least one processor, generate an alarm based on the laser diode being controlled to reduce the light output.

According to another aspect of the subject matter, a lamp for a vehicle, which includes an object detection device configured to detect an object around the vehicle, includes a laser diode configured to output light, an interface configured to communicate with the object detection device, and at least one processor coupled to the interface and configured to receive, from the object detection device via the interface, an estimated time to collision between the vehicle and the object, and to control a light output of the laser diode based on the estimated time to collision.

According to another aspect, a vehicle includes a plurality of wheels, a power source configured to drive a rotation of at least one of the plurality of wheels, and a lamp. The lamp includes a laser diode configured to output light, an interface configured to communicate with a brake device of the vehicle, and at least one processor coupled to the interface and configured to receive brake operation information from the brake device via the interface, and to control a light output of the laser diode based on the brake operation information.

Concrete details of other implementations are included in the detailed description and the drawings.

BRIEF DESCRIPTION OF THE DRAWINGS

FIG. 9 is a flowchart illustrating an example operation of the lamp for a vehicle.

DETAILED DESCRIPTION

Figure 1:
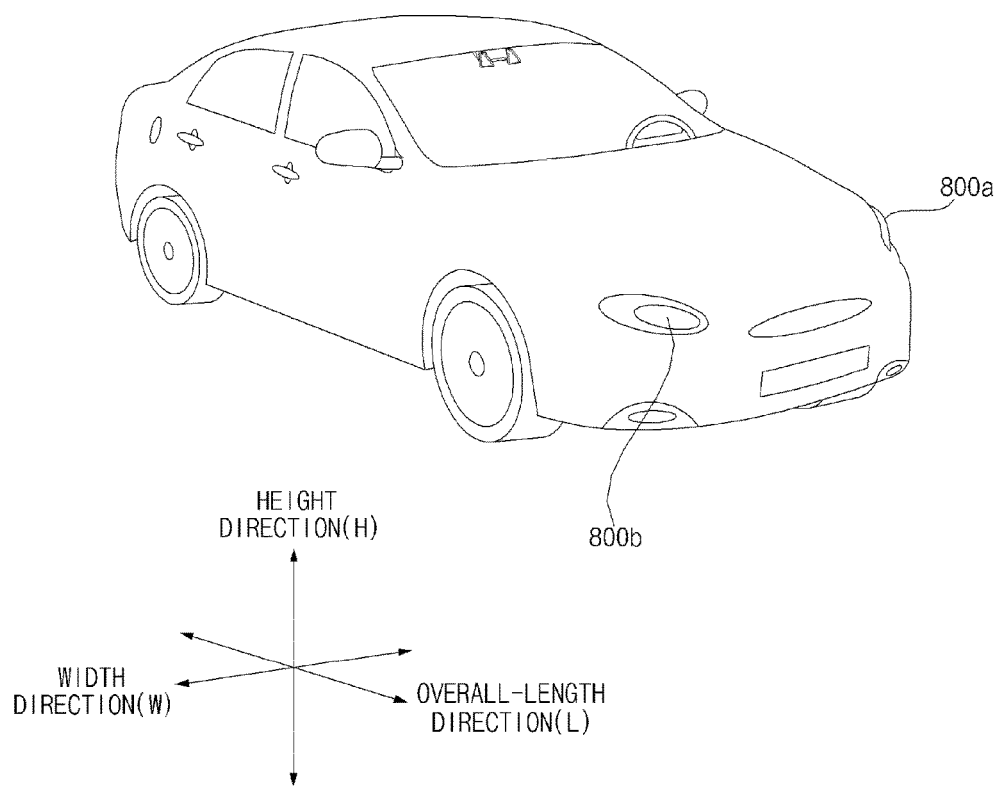
FIG. 1 is a view illustrating an example exterior of an example vehicle.

Example implementations disclosed in the present disclosure will be described in detail with reference to the attached drawings. Like reference numerals denote the same or similar components throughout the drawings and a redundant description of the same components will be avoided.

The term "vehicle" as used in the present disclosure may refer to a car, a motorbike, or other types of vehicles. The following description is given with the appreciation that a vehicle is a car, by way of example.

In the present disclosure, a vehicle may be any of an internal combustion vehicle equipped with an engine as a power source, a hybrid vehicle equipped with an engine and an electrical motor as power sources, an electric vehicle equipped with an electrical motor as a power source, and the like.

In the following description, the left of a vehicle is the left of a driving direction of the vehicle, and the right of the vehicle is the right of the driving direction of the vehicle.

FIG. 1 illustrates an example exterior of an example vehicle.

Figure 2:
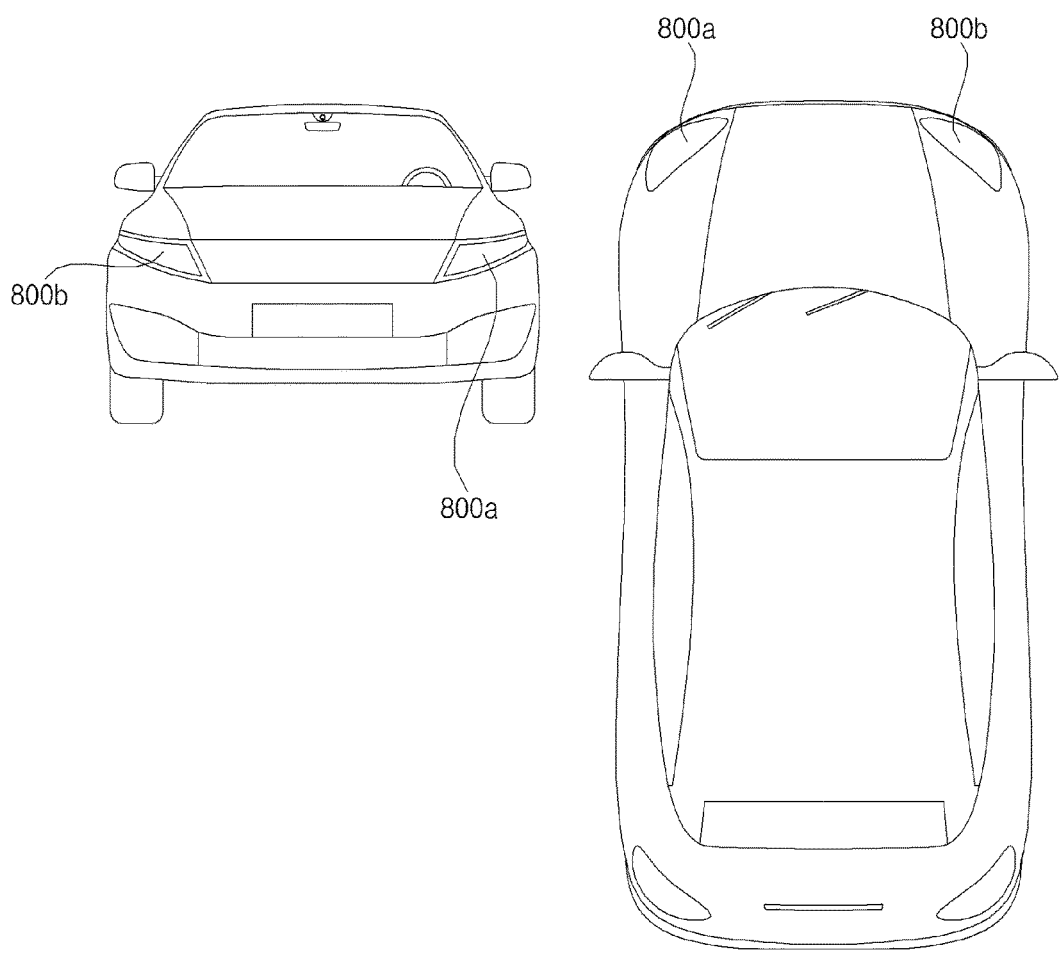
FIG. 2 is a view illustrating example exteriors of an example vehicle seen at various angles from outside of the vehicle.

FIG. 2 illustrates example exteriors of a vehicle, seen at various angles from an outside of the vehicle.

Figure 3:
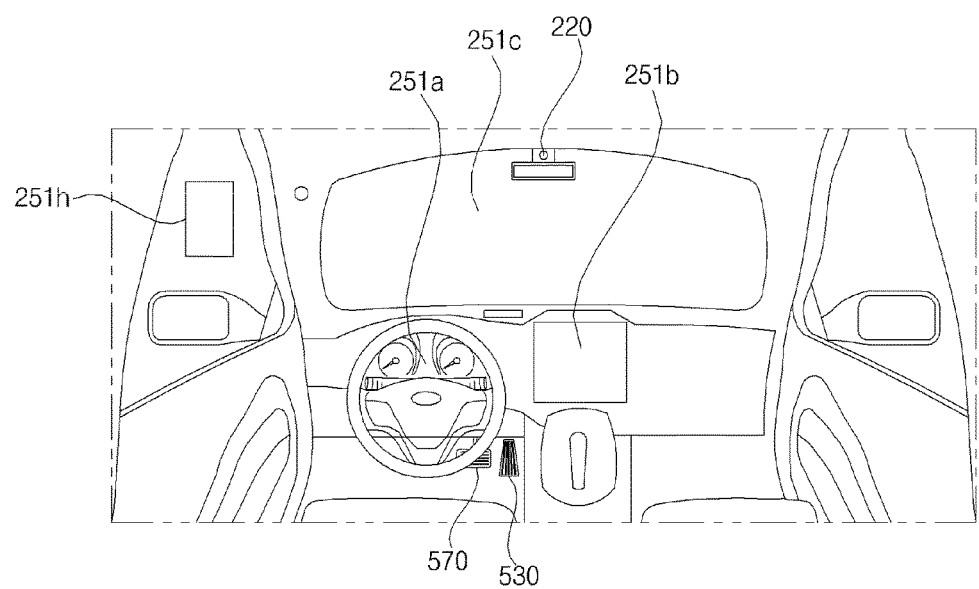
FIGS. 3 and 4 are views illustrating example interiors of an example vehicle.
Figure 4:
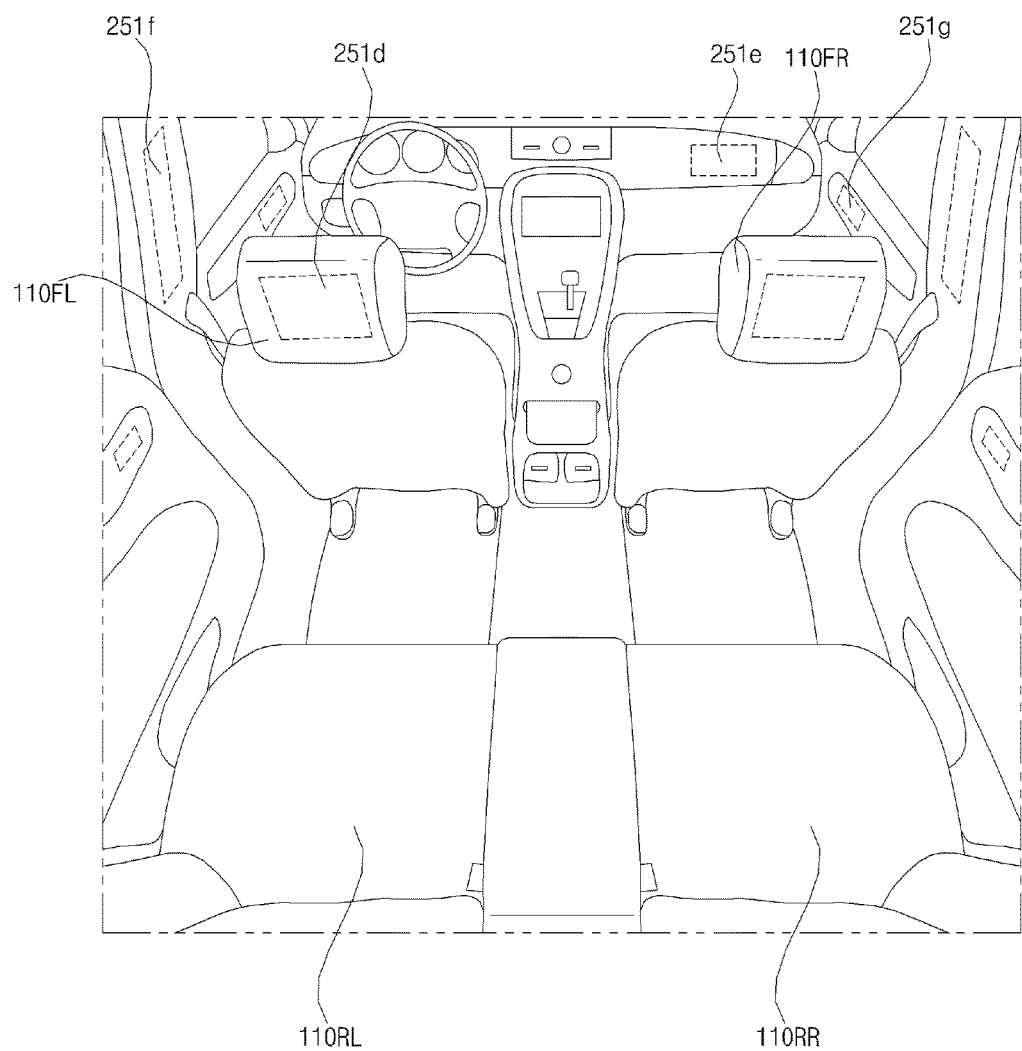

FIGS. 3 and 4 illustrate example interiors of a vehicle.

Figure 5:
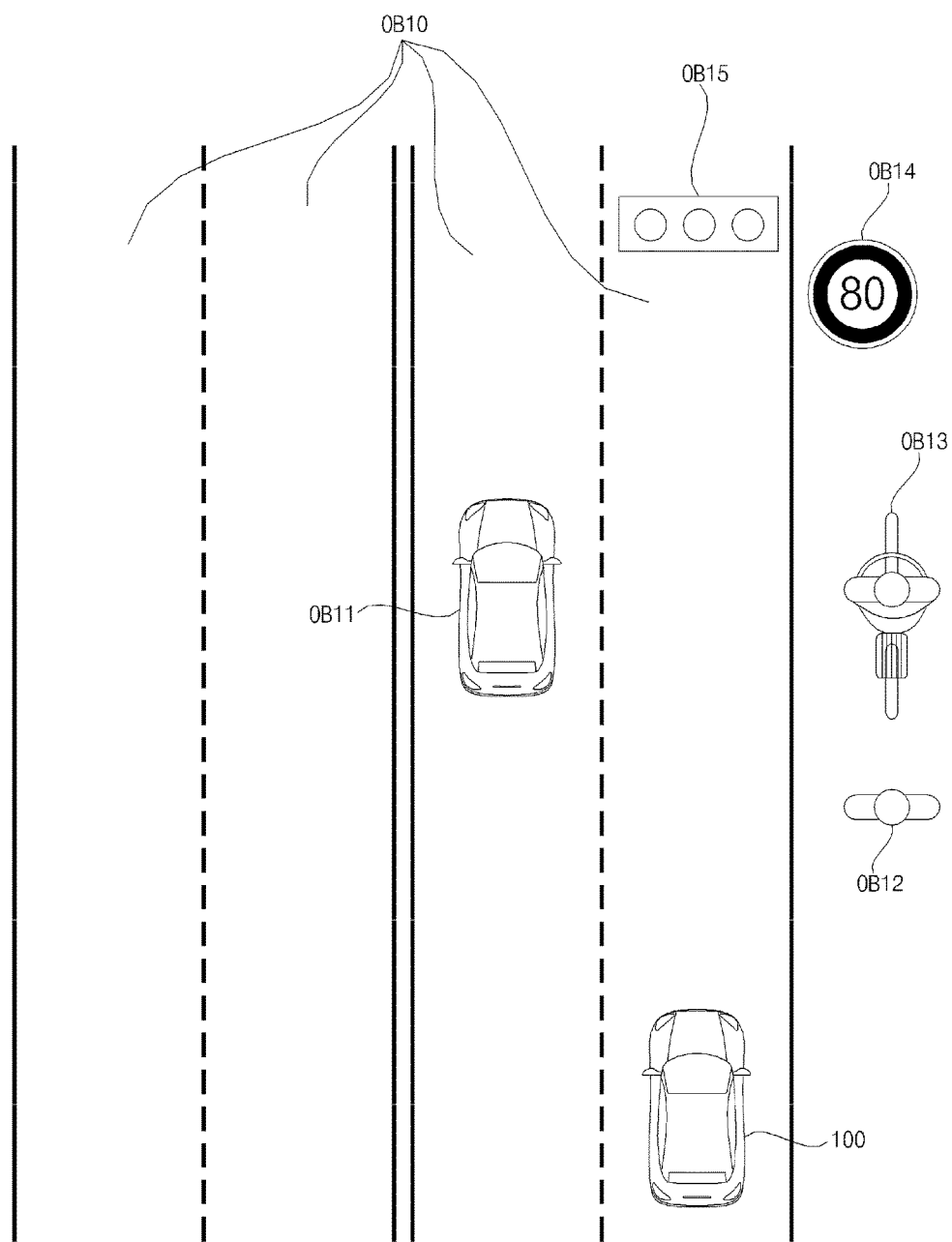
FIGS. 5 and 6 are views illustrating example objects.
Figure 6:
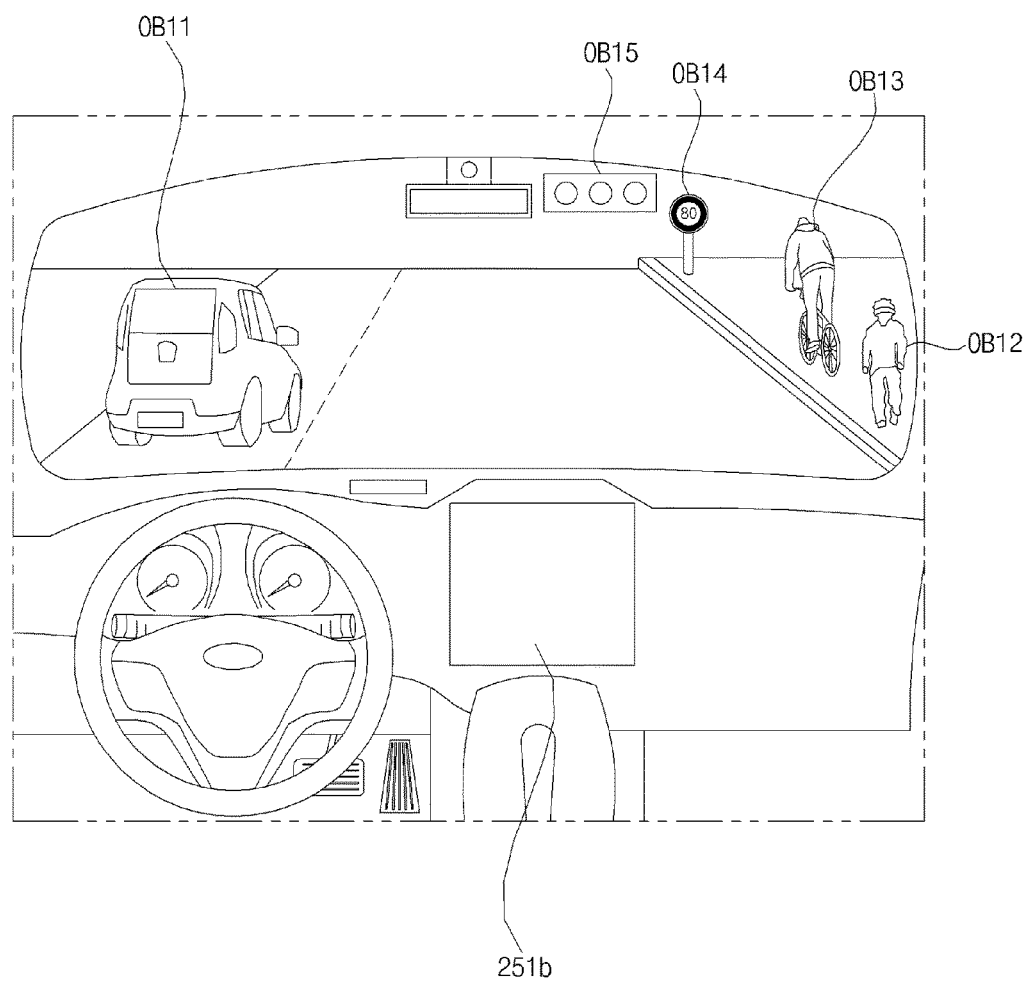

FIGS. 5 and 6 illustrate example objects.

Figure 7:
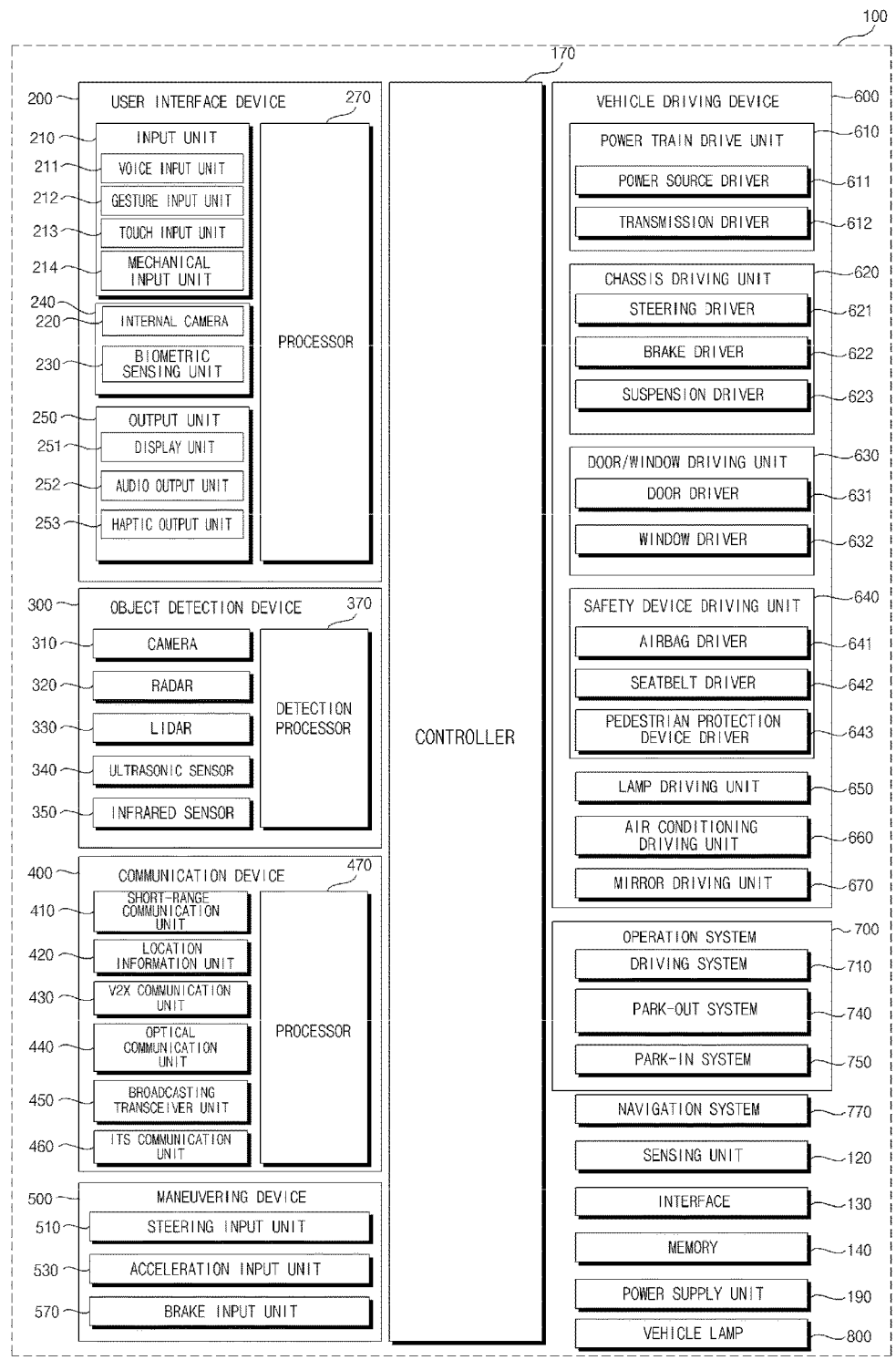
FIG. 7 is a block diagram of example components of an example vehicle.

FIG. 7 is a block diagram of example components of a vehicle.

Referring to FIGS. 1 to 7, a vehicle 100 may include wheels rotated by a power source, and a steering input device 510 for controlling a heading direction of the vehicle 100.

The vehicle 100 may include an autonomous vehicle.

The vehicle 100 may switch to an autonomous driving mode or a manual mode based on a user input.

For example, the vehicle 100 may switch from the manual mode to the autonomous driving mode or from the autonomous driving mode to the manual mode, based on a user input received through a User Interface (UI) device 200.

The vehicle 100 may switch to the autonomous driving mode or the manual mode based on driving situation information.

The driving situation information may include at least one of information on objects outside the vehicle 100, navigation information, or vehicle state information.

For example, the vehicle 100 may switch from the manual mode to the autonomous driving mode or from the autonomous driving mode to the manual mode, based on driving situation information generated from an object detection device 300.

For example, the vehicle 100 may switch from the manual mode to the autonomous driving mode or from the autonomous driving mode to the manual mode, based on driving situation information received through a communication device 400.

The vehicle 100 may switch from the manual mode to the autonomous driving mode or from the autonomous driving mode to the manual mode, based on information, data, or signals provided from external devices.

When the vehicle 100 drives in the autonomous driving mode, the autonomous vehicle 100 may drive based on an operation system 700.

For example, the autonomous vehicle 100 may drive based on information, data, or signals generated from a driving system 710, a park-out system 740, and a park-in system 750.

When the vehicle 100 drives in the manual mode, the autonomous vehicle 100 may receive a user input for driving through a maneuvering device 500. The vehicle 100 may drive based on the user input received through the maneuvering device 500.

An overall length refers to a length from the front side to the rear side of the vehicle 100, an overall width refers to a width of the vehicle 100, and an overall height refers to a length from the bottom of a wheel to the roof of the vehicle 100. In the following description, an overall length direction L may refer to a direction based on which the overall length of the vehicle 100 is measured, an overall width direction W may refer to a direction based on which the overall width of the vehicle 100 is measured, and an overall height direction H may refer to a direction based on which the overall height of the vehicle 100 is measured.

Referring to FIG. 7, the vehicle 100 may include the user interface device 200, the object detection device 300, the communication device 400, the maneuvering device 500, a vehicle driving device 600, the operation system 700, a navigation system 770, a sensing unit 120, an interface 130, a memory 140, a controller 170, a power supply unit 190, and a lamp 800 for a vehicle. In some implementations, the controller 170 may include at least one processor.

In some implementations, the vehicle 100 may further include a new component in addition to the components described in the present disclosure, or may not include some of the described components.

The user interface device 200 is a device used to enable the vehicle 100 to communicate with a user. The user interface device 200 may receive a user input, and provide information generated from the vehicle 100 to the user. The vehicle 100 may implement UIs or User Experience (UX) through the user interface device 200.

The user interface device 200 may include an input unit 210, an internal camera 220, a biometric sensing unit 230, an output unit 250, and a processor 270.

In some implementations, the user interface device 200 may further include a new component in addition to components described below, or may not include some of the described components.

The input unit 210 is configure to receive information from a user. Data collected by the input unit 210 may be analyzed and processed as a control command from the user by the processor 270.

The input unit 210 may be disposed inside the vehicle 100. For example, the input unit 210 may be disposed in an area of a steering wheel, an area of an instrument panel, an area of a seat, an area of each pillar, an area of a door, an area of a center console, an area of a head lining, an area of a sun visor, an area of a windshield, an area of a window, or the like.

The input unit 210 may include a voice input unit 211, a gesture input unit 212, a touch input unit 213, and a mechanical input unit 214.

The voice input unit 211 may convert a voice input of the user to an electrical signal. The electrical signal may be provided to the processor 270 or the controller 170.

The voice input unit 211 may include one or more microphones.

The gesture input unit 212 may convert a gesture input of the user to an electrical signal. The electrical signal may be provided to the processor 270 or the controller 170.

The gesture input unit 212 may include at least one of an Infrared (IR) sensor or an image sensor, for sensing a gesture input of the user.

In some implementations, the gesture input unit 212 may sense a Three-Dimensional (3D) gesture input of the user. To this end, the gesture input unit 212 may include a light output unit for emitting multiple IR rays or multiple image sensors.

The gesture input unit 212 may sense a 3D gesture input of the user by Time of Flight (ToF), structured light, or disparity.

The touch input unit 213 may convert a touch input of the user to an electrical signal. The electrical signal may be provided to the processor 270 or the controller 170.

The touch input unit 213 may include a touch sensor for sensing a touch input of the user.

In some implementations, a touch screen may be configured by integrating the touch input unit 213 with a display unit 251. This touch screen may provide both an input interface and an output interface between the vehicle 100 and the user.

The mechanical input unit 214 may include at least one of a button, a dome switch, a jog wheel, or a jog switch. An electrical signal generated by the mechanical input unit 214 may be provided to the processor 270 or the controller 170.

The mechanical input unit 214 may be disposed on a steering wheel, a center fascia, the center console, a cockpit module, a door, or the like.

The internal camera 220 may acquire a vehicle interior image. The processor 270 may sense the state of a user based on the vehicle interior image. The processor 270 may acquire information on the gaze of the user in the vehicle interior image. The processor 270 may sense a gesture of the user in the vehicle interior image.

The biometric sensing unit 230 may acquire biometric information on the user. The biometric sensing unit 230 may include a sensor for acquiring biometric information on the user, and acquire information on a fingerprint, heart beats, and the like of the user, using the sensor. The biometric information may be used for user authentication.

The output unit 250 is configured to generate a visual output, an acoustic output, or a haptic output.

The output unit 250 may include at least one of the display unit 251, an audio output unit 252, or a haptic output unit 253.

The display unit 251 may display graphic objects corresponding to various pieces of information.

The display unit 251 may include at least one of a Liquid Crystal Display (LCD), a Thin-Film Transistor LCD (TFT LCD), an Organic Light Emitting Diode (OLED) display, a flexible display, a 3D display, or an e-ink display.

A touch screen may be configured by forming a multi-layered structure of the display unit 251 and the touch input unit 213, or by integrating the display unit 251 with the touch input unit 213.

The display unit 251 may be configured as a Head Up Display (HUD). When the display unit 251 is configured as a HUD, the display unit 251 may be provided with a projection module to output information by an image projected onto the windshield or the window.

The display unit 251 may include a transparent display. The transparent display may be attached onto the windshield or the window.

The transparent display may display a specific screen with a specific transparency. To have a transparency, the transparent display may include at least one of a transparent Thin Film Electroluminescent (TFFL) display, a transparent OLED display, a transparent LCD, a transmissive transparent display, or a transparent LED display. The transparency of the transparent display is controllable.

Meanwhile, the user interface device 200 may include multiple display units 251a to 251g.

The display unit 251 may be disposed in an area of the steering wheel, areas 251a, 251b and 251e of the instrument panel, an area 251d of a seat, an area 251f of each pillar, an area 251g of a door, an area of the center console, an area of a head lining, or an area of a sun visor, or may be implemented in an area 251c of the windshield and an area 251h of the window.

The audio output unit 252 converts an electrical signal received from the processor 270 or the controller 170 to an audio signal, and outputs the audio signal. To this end, the audio output unit 252 may include one or more speakers.

The haptic output unit 253 generates a haptic output. For example, the haptic output unit 253 may vibrate the steering wheel, a safety belt, a seat 110FL, 110FR, 110RL, or 110RR, so that the user may perceive the output.

The processor 270 may provide overall control to each unit of the user interface device 200.

In some implementations, the user interface device 200 may include multiple processors 270 or no processor 270.

When the user interface device 200 does not include any processor 270, the user interface device 200 may operate under the control of a processor of another device in the vehicle 100, or under the control of the controller 170.

Meanwhile, the user interface device 200 may be referred to as a vehicle display device.

The user interface device 200 may operate under the control of the controller 170.

The object detection device 300 is a device used to detect an object outside the vehicle 100. The object detection device 300 may generate object information based on sensing data.

The object information may include information indicating the presence or absence of an object, information on the location of an object, information indicating the distance between the vehicle 100 and an object, and information on the speed of the vehicle 100 relative to an object.

An object may be any of various items related to driving of the vehicle 100.

Referring to FIGS. 5 and 6, objects O may include lanes OB10, another vehicle OB11, a pedestrian OB12, a 2-wheel vehicle OB13, traffic signals OB14 and OB15, light, a road, a structure, a speed bump, topography, an animal, and the like.

The lanes OB10 may include a driving lane, a lane next to the driving lane, and a lane in which an opposite vehicle is driving. The lanes OB10 may conceptually include left and right lines that define each of the lanes. The lane may conceptually include the crossroad.

The other vehicle OB11 may be a vehicle driving in the vicinity of the vehicle 100. The other vehicle OB11 may be located within a predetermined distance from the vehicle 100. For example, the other vehicle OB11 may precede or follow the vehicle 100.

The pedestrian OB12 may be a person located around the vehicle 100. The pedestrian OB12 may be a person located within a predetermined distance from the vehicle 100. For example, the pedestrian OB12 may be a person on a sidewalk or a roadway.

The 2-wheel vehicle OB13 may refer to a transportation apparatus moving on two wheels, located around the vehicle 100. The 2-wheel vehicle OB13 may be a transportation apparatus having two wheels, located within a predetermined distance from the vehicle 100. For example, the 2-wheel vehicle OB13 may be a motorbike or bicycle on a sidewalk or a roadway.

The traffic signals may include a traffic signal lamp OB15, a traffic sign OB14, and a symbol or text drawn or written on a road surface.

The light may be light generated from a lamp of another vehicle. The light may be generated from a street lamp. The light may be sunlight.

The road may include a road surface, a curb, a ramp such as a down-ramp or an up-ramp, and the like.

The structure may be an object fixed on the ground, near to a road. For example, the structure may be any of a street lamp, a street tree, a building, a telephone pole, a signal lamp, and a bridge.

The topography may include a mountain, a hill, and the like.

Meanwhile, objects may be classified into mobile objects and fixed objects. For example, the mobile objects may conceptually include another vehicle, which is moving, and a pedestrian who is moving. For example, the fixed objects may conceptually include a traffic signal, a road, a structure, a vehicle, each of which stops, and a pedestrian who stops.

The object detection device 300 may include a camera 310, a Radio Detection and Ranging (RADAR) 320, a Light Detection and Ranging (LiDAR) 330, an ultrasonic sensor 340, an infrared sensor 350, and a processor 370.

In some implementations, the object detection device 300 may further include a new component in addition to components described below or may not include a part of the described components.

To acquire a vehicle exterior image, the camera 310 may be disposed at an appropriate position on the exterior of the vehicle 100. The camera 310 may be a mono camera, a stereo camera 310a, Around View Monitoring (AVM) cameras 310b, or a 360-degree camera.

The camera 310 may acquire information on the location of an object, information on the distance to the object, or information on the relative speed of the object using any of various image processing algorithms.

For example, the camera 310 may acquire information on the distance to an object and information on the speed relative to the object in an acquired image, based on a variation in the size of the object over time.

For example, the camera 310 may acquire information on the distance to an object and information regarding the speed relative to the object through a pin hole model, road surface profiling, or the like.

For example, the camera 310 may acquire information on the distance to an object and information regarding the speed relative to the object, based on disparity information in a stereo image acquired by the stereo camera 310a.

For example, to acquire an image of what lies ahead of the vehicle 100, the camera 310 may be disposed in the vicinity of a front windshield inside the vehicle 100. Alternatively, the camera 310 may be disposed around a front bumper or a radiator grill.

For example, to acquire an image of what lies behind the vehicle 100, the camera 310 may be disposed in the vicinity of a rear glass inside the vehicle 100. Alternatively, the camera 310 may be disposed around a rear bumper, a trunk, or a tail gate.

For example, to acquire an image of what lies on a side of the vehicle 100, the camera 310 may be disposed in the vicinity of at least one of side windows inside the vehicle 100. Alternatively, the camera 310 may be disposed around a side mirror, a fender, or a door.

The camera 310 may provide an acquired image to the processor 370.

The RADAR 320 may include an electromagnetic wave transmitter and an electromagnetic wave receiver. The RADAR 320 may be implemented by pulse RADAR or continuous wave RADAR. The RADAR 320 may be implemented by Frequency Modulated Continuous Wave (FMCW) or Frequency Shift Keying (FSK) as a pulse RADAR scheme according to a signal waveform.

The RADAR 320 may detect an object in TOF or phase shifting by electromagnetic waves, and determine the location, distance, and relative speed of the detected object.

The RADAR 320 may be disposed at an appropriate position on the exterior of the vehicle 100, in order to sense an object ahead of, behind, or beside the vehicle 100.

The LiDAR 330 may include a laser transmitter and a laser receiver. The LiDAR 330 may be implemented in TOF or phase shifting.

The LiDAR 330 may be implemented in a driven or non-driven manner.

When the LiDAR 330 is implemented in a driven manner, the LiDAR 330 may be rotated by a motor and detect an object around the vehicle 100.

When the LiDAR 330 is implemented in a non-driven manner, the LiDAR 330 may detect an object within a predetermined range from the vehicle 100 by optical steering. The vehicle 100 may include multiple non-driven LiDARs 330.

The LiDAR 330 may detect an object in TOF or phase shifting by laser light, and determine the location, distance, and relative speed of the detected object.

The LiDAR 330 may be disposed at an appropriate position on the exterior of the vehicle 100 in order to sense an object ahead of, behind, or beside the vehicle 100.

The ultrasonic sensor 340 may include an ultrasonic wave transmitter and an ultrasonic wave receiver. The ultrasonic sensor 340 may detect an object by ultrasonic waves, and determine the location, distance, and relative speed of the detected object.

The ultrasonic sensor 340 may be disposed at an appropriate position on the exterior of the vehicle 100, in order to sense an object ahead of, behind, or beside the vehicle 100.

The infrared sensor 350 may include an IR transmitter and an IR receiver. The infrared sensor 350 may detect an object by IR light, and determine the location, distance, and relative speed of the detected object.

The infrared sensor 350 may be disposed at an appropriate position on the exterior of the vehicle 100, in order to sense an object ahead of, behind, or beside the vehicle 100.

The processor 370 may provide overall control to each unit of the object detection device 300.

The processor 370 may detect or classify an object by comparing data sensed by the camera 310, the RADAR 320, the LiDAR 330, the ultrasonic sensor 340, and the infrared sensor 350 with pre-stored data.

The processor 370 may detect an object and track the detected object, based on an acquired image. The processor 370 may calculate the distance to the object, the speed of the vehicle 100 relative to the object, and the like by an image processing algorithm.

For example, the processor 370 may acquire information on the distance to an object and information regarding the speed of the vehicle 100 relative to the object from an acquired image, based on a variation in the size of the object over time.

For example, the processor 370 may acquire information on the distance to an object and information regarding the speed of the vehicle 100 relative to the object via a pin hole model, road surface profiling, or the like.

For example, the processor 370 may acquire information on the distance to an object and information regarding the speed of the vehicle 100 relative to the object from an image acquired from the stereo camera 310a, based on disparity information.

The processor 370 may detect an object and track the detected object based on electromagnetic waves, which are transmitted, are reflected from the object, and then return. The processor 370 may calculate the distance to the object and the speed of the vehicle 100 relative to the object, based on the electromagnetic waves.

The processor 370 may detect an object and track the detected object based on laser light, which is transmitted, is reflected from the object, and then returns. The processor 370 may calculate the distance to the object and the speed of the vehicle 100 relative to the object, based on the laser light.

The processor 370 may detect an object and track the detected object based on ultrasonic waves, which are transmitted, are reflected from the object, and then return. The processor 370 may calculate the distance to the object and the speed of the vehicle 100 relative to the object, based on the ultrasonic waves.

The processor 370 may detect an object and track the detected object based on IR light, which is transmitted, is reflected from the object, and then returns. The processor 370 may calculate the distance to the object and the speed of the vehicle 100 relative to the object, based on the IR light.

In some implementations, the object detection device 300 may include multiple processors 370 or no processor 370. For example, the camera 310, the RADAR 320, the LiDAR 330, the ultrasonic sensor 340, and the infrared sensor 350 may include individual processors.

When the object detection device 300 includes no processor 370, the object detection device 300 may operate under the control of a processor of another device in the vehicle 100 or under the control of the controller 170.

The object detection device 300 may operate under the control of the controller 170.

The communication device 400 is used to communicate with an external device. The external device may be another vehicle, a mobile terminal, or a server.

The communication device 400 may include at least one of a transmission antenna and a reception antenna, for communication, and a Radio Frequency (RF) circuit and device, for implementing various communication protocols.

The communication device 400 may include a short-range communication unit 410, a location information unit 420, a Vehicle to Everything (V2X) communication unit 430, an optical communication unit 440, a broadcasting transceiver unit 450, an Intelligent Transport System (ITS) communication unit 460, and a processor 470.

In some implementations, the communication device 400 may further include a new component in addition to components described below, or may not include a part of the described components.

The short-range communication unit 410 may be a unit for conducting short-range communication. The short-range communication unit 410 may support short-range communication, using at least one of Bluetooth™, Radio Frequency Identification (RFID), Infrared Data Association (IrDA), Ultra Wideband (UWB), ZigBee, Near Field Communication (NFC), Wireless Fidelity (Wi-Fi), Wi-Fi Direct, or Wireless Universal Serial Bus (Wireless USB).

The short-range communication unit 410 may conduct short-range communication between the vehicle 100 and at least one external device by establishing a wireless area network.

The location information unit 420 is a unit configured to acquire information on the location of the vehicle 100. For example, the location information unit 420 may include a GPS module or a Differential Global Positioning System (DGPS) module.

The V2X communication unit 430 is a unit used for wireless communication with a server (by Vehicle to Infrastructure (V2I)), another vehicle (by Vehicle to Vehicle (V2V)), or a pedestrian (by Vehicle to Pedestrian (V2P)). The V2X communication unit 430 may include an RF circuit capable of implementing a V2I protocol, a V2V protocol, and a V2P protocol.

The optical communication unit 440 is a unit used to communicate with an external device by light. The optical communication unit 440 may include an optical transmitter for converting an electrical signal to an optical signal and emitting the optical signal to the outside, and an optical receiver for converting a received optical signal to an electrical signal.

In some implementations, the optical transmitter may be integrated with a lamp included in the vehicle 100.

The broadcasting transceiver unit 450 is a unit used to receive a broadcast signal from an external broadcasting management server or transmit a broadcast signal to the broadcasting management server, on a broadcast channel. The broadcast channel may include a satellite channel and a terrestrial channel. The broadcast signal may include a TV broadcast signal, a radio broadcast signal, and a data broadcast signal.

The ITS communication unit 460 may exchange information, data, or signals with a traffic system. The ITS communication unit 460 may provide acquired information, data or signals to the traffic system. The ITS communication unit 460 may receive information, data, or a signal from the traffic system. For example, the ITS communication unit 460 may receive traffic information from the traffic system and provide the received traffic information to the controller 170. For example, the ITS communication unit 460 may receive a control signal from the traffic system, and provide the received control signal to the controller 170 or a processor in the vehicle 100.

The processor 470 may provide overall control to each unit of the communication device 400.

In some implementations, the communication device 400 may include multiple processors 470 or no processor 470.

When the communication device 400 does not include any processor 470, the communication device 400 may operate under the control of a processor of another device in the vehicle 100 or under the control of the controller 170.

Meanwhile, the communication device 400 may be configured, along with the user interface device 200, as a vehicle multimedia device. In this case, the vehicle multimedia device may be referred to as a telematics device or an Audio Video Navigation (AVN) device.

The communication device 400 may operate under the control of the controller 170.

The maneuvering device 500 is a device used to receive a user command for driving the vehicle 100.

In the manual mode, the vehicle 100 may drive based on a signal provided by the maneuvering device 500.

The maneuvering device 500 may include the steering input device 510, an acceleration input device 530, and a brake input device 570.

The steering input device 510 may receive a heading direction input for the vehicle 100 from the user. The steering input device 510 may be configured as a wheel for enabling a steering input by rotation. In some implementations, the steering input device 510 may be configured as a touch screen, a touchpad, or a button.

The acceleration input device 530 may receive an input for acceleration of the vehicle 100 from the user. The brake input device 570 may receive an input for deceleration of the vehicle 100 from the user. The acceleration input device 530 and the brake input device 570 may be formed into pedals. In some implementations, the acceleration input device 530 or the brake input device 570 may be configured as a touch screen, a touchpad, or a button.

The maneuvering device 500 may operate under the control of the controller 170.

The vehicle driving device 600 is a device used to electrically control driving of various devices of the vehicle 100.

The vehicle driving device 600 may include a power train driving unit 610, a chassis driving unit 620, a door/window driving unit 630, a safety device driving unit 640, a lamp driving unit 650, and an air conditioner driving unit 660.

In some implementations, the vehicle driving device 600 may further include a new component in addition to components described below or may not include a part of the components.

Meanwhile, the vehicle driving device 600 may include a processor. Each individual unit of the vehicle driving device 600 may include a processor.

The power train driving unit 610 may control the operation of a power train device.

The power train driving unit 610 may include a power source driver 611 and a transmission driver 612.

The power source driver 611 may control a power source of the vehicle 100.

For example, when the power source is a fossil fuel-based engine, the power source driver 611 may perform electronic control on the engine. Therefore, the power source driver 611 may control an output torque of the engine, and the like. The power source driver 611 may adjust the engine output torque under the control of the controller 170.

For example, when the power source is an electrical energy-based motor, the power source driver 611 may control the motor. The power source driver 611 may adjust the rotation speed, torque, and the like of the motor under the control of the controller 170.

The transmission driver 612 may control a transmission.

The transmission driver 612 may adjust the state of the transmission. The transmission driver 612 may adjust the state of the transmission to drive D, reverse R, neutral N, or park P.

When the power source is an engine, the transmission driver 612 may adjust the engagement state of a gear in the drive state D.

The chassis driving unit 620 may control the operation of a chassis device.

The chassis driving unit 620 may include a steering driver 621, a brake driver 622, and a suspension driver 623.

The steering driver 621 may perform electronic control on a steering device in the vehicle 100. The steering driver 621 may change a heading direction of the vehicle 100.

The brake driver 622 may perform electronic control on a brake device in the vehicle 100. For example, the brake driver 622 may decrease the speed of the vehicle 100 by controlling the operation of a brake disposed at a tire.

Meanwhile, the brake driver 622 may control multiple brakes individually. The brake driver 622 may differentiate braking power applied to multiple wheels.

The suspension driver 623 may perform electronic control on a suspension device in the vehicle 100. For example, when the surface of a road is rugged, the suspension driver 623 may control the suspension device to reduce jerk of the vehicle 100.

Meanwhile, the suspension driver 623 may control multiple suspensions individually.

The door/window driving unit 630 may perform electronic control on a door device or a window device in the vehicle 100.

The door/window driving unit 630 may include a door driver 631 and a window driver 632.

The door driver 631 may perform electronic control on a door device. For example, the door driver 631 may control opening and closing of multiple doors in the vehicle 100. The door driver 631 may control opening or closing of the trunk or the tail gate. The door driver 631 may control opening or closing of the sunroof.

The window driver 632 may perform electronic control on a window device in the vehicle 100. The window driver 632 may control opening or closing of multiple windows in the vehicle 100.

The safety device driving unit 640 may perform electronic control on various safety devices in the vehicle 100.

The safety device driving unit 640 may include an airbag driver 641, a seatbelt driver 642, and a pedestrian protection device driver 643.

The airbag driver 641 may perform electronic control on an airbag device in the vehicle 100. For example, the airbag driver 641 may control inflation of an airbag, upon sensing an emergency situation.

The seatbelt driver 642 may perform electronic control on a seatbelt device in the vehicle 100. For example, the seatbelt driver 642 may control seatbelts to secure passengers on the seats 110FL, 110FR, 110RL, and 110RR upon sensing a danger.

The pedestrian protection device driver 643 may perform electronic control on a hood lift and a pedestrian airbag in the vehicle 100. For example, the pedestrian protection device driver 643 may control hood lift-up and inflation of the pedestrian airbag, upon sensing collision with a pedestrian.

The lamp driving unit 650 may perform electronic control on various lamp devices in the vehicle 100.

The air conditioner driving unit 660 may perform electronic control on an air conditioner in the vehicle 100. For example, when a vehicle internal temperature is high, the air conditioner driver 660 may control the air conditioner to operate and supply cool air into the vehicle 100.

The vehicle driving device 600 may include a processor. Each individual unit of the vehicle driving device 600 may include a processor.

The vehicle driving device 600 may operate under the control of the controller 170.

The operation system 700 is a system that controls various operations of the vehicle 100. The operation system 700 may operate in the autonomous driving mode.

The operation system 700 may include the driving system 710, the park-out system 740, and the park-in system 750.

In some implementations, the operation system 700 may further include a new component in addition to components described below or may not include a part of the described components.

In some implementations, the operation system 700 may include a processor. Each individual unit of the operation system 700 may include a processor.

In some implementations, when the operation system 700 is implemented in software, the operation system 700 may lie under the controller 170 in concept.

In some implementations, the operation system 700 may conceptually include at least one of the user interface device 200, the object detection device 300, the communication device 400, the maneuvering device 500, the vehicle driving device 600, the navigation system 770, the sensing unit 120, or the controller 170.

The driving system 710 may drive the vehicle 100.

The driving system 710 may drive the vehicle 100 by providing a control signal to the vehicle driving device 600 based on navigation information received from the navigation system 770.

The driving system 710 may drive the vehicle 100 by providing a control signal to the vehicle driving device 600 based on object information received from the object detection device 300.

The driving system 710 may drive the vehicle 100 by receiving a signal from an external device through the communication device 400 and providing a control signal to the vehicle driving device 600.

Conceptually, the driving system 710 may be a system that drives the vehicle 100, including at least one of the user interface device 200, the object detection device 300, the communication device 400, the maneuvering device 500, the vehicle driving device 600, the navigation system 770, the sensing unit 120, or the controller 170.

The driving system 710 may be referred to as a vehicle driving control device.

The park-out system 740 may perform park-out of the vehicle 100.

The park-out system 740 may perform park-out of the vehicle 100 by providing a control signal to the vehicle driving device 600 based on navigation information received from the navigation system 770.

The park-out system 740 may perform park-out of the vehicle 100 by providing a control signal to the vehicle driving device 600 based on object information received from the object detection device 300.

The park-out system 740 may perform park-out of the vehicle 100 by receiving a signal from an external device through the communication device 400 and providing a control signal to the vehicle driving device 600.

Conceptually, the park-out system 740 may be a system that performs park-out of the vehicle 100, including at least one of the user interface device 200, the object detection device 300, the communication device 400, the maneuvering device 500, the vehicle driving device 600, the navigation system 770, the sensing unit 120, or the controller 170.

The park-out system 740 may be referred to as a vehicle park-out control device.

The park-in system 750 may perform park-in of the vehicle 100.

The park-in system 750 may perform park-in of the vehicle 100 by providing a control signal to the vehicle driving device 600 based on navigation information received from the navigation system 770.

The park-in system 750 may perform park-in of the vehicle 100 by providing a control signal to the vehicle driving device 600 based on object information received from the object detection device 300.

The park-in system 750 may perform park-in of the vehicle 100 by receiving a signal from an external device through the communication device 400 and providing a control signal to the vehicle driving device 600.

Conceptually, the park-in system 750 may be a system that performs park-in of the vehicle 100, including at least one of the user interface device 200, the object detection device 300, the communication device 400, the maneuvering device 500, the vehicle driving device 600, the navigation system 770, the sensing unit 120, or the controller 170.

The park-in system 750 may be referred to as a vehicle park-in control device.

The navigation system 770 may provide navigation information. The navigation information may include at least one of map information, set destination information, route information based on setting of a destination, information regarding various objects on a route, lane information, or information regarding a current location of a vehicle.

The navigation system 770 may include a memory and a processor. The memory may store navigation information. The processor may control operation of the navigation system 770.

In some implementations, the navigation system 770 may receive information from an external device through the communication device 400 and update pre-stored information using the received information.

In some implementations, the navigation system 770 may be classified as a lower-layer component of the user interface device 200.

The sensing unit 120 may sense the state of the vehicle 100. The sensing unit 120 may include an inertial navigation unit (IMU) sensor, a collision sensor, a wheel sensor, a speed sensor, an inclination sensor, a weight sensor, a heading sensor, a position module, a vehicle forwarding/backwarding sensor, a battery sensor, a fuel sensor, a tire sensor, a handle rotation-based steering sensor, a vehicle internal temperature sensor, a vehicle internal humidity sensor, an ultrasonic sensor, an illumination sensor, an accelerator pedal position sensor, a brake pedal position sensor, and the like.

Meanwhile, the IMU sensor may include one or more of an acceleration sensor, a gyro sensor, and a magnetic sensor.

The sensing unit 120 may acquire sensing signals for a vehicle posture information, vehicle motion information, vehicle yaw information, vehicle roll information, vehicle pitch information, vehicle collision information, vehicle heading information, vehicle location information (Global Positioning System (GPS) information), vehicle angle information, vehicle speed information, vehicle acceleration information, vehicle inclination information, vehicle forwarding/backwarding information, battery information, fuel information, tire information, lamp for a vehicle information, vehicle internal temperature information, vehicle internal humidity information, a steering wheel rotation angle, a vehicle external illuminance, a pressure applied to an accelerator pedal, a pressure applied to a brake pedal, and the like.

The sensing unit 120 may further include an accelerator pedal sensor, a pressure sensor, an engine speed sensor, an Air Flow Sensor (AFS), an Air Temperature Sensor (ATS), a Water Temperature Sensor (WTS), a Throttle Position Sensor (TPS), a Top Dead Center (TDC) sensor, a Crank Angle Sensor (CAS), and the like.

The sensing unit 120 may generate vehicle state information based on sensing data. The vehicle state information may be information generated based on data sensed by various sensors in the vehicle 100.

For example, the vehicle state information may include vehicle posture information, vehicle speed information, vehicle inclination information, vehicle weight information, vehicle heading information, vehicle battery information, vehicle fuel information, vehicle tire pressure information, vehicle steering information, vehicle internal temperature information, vehicle internal humidity information, pedal position information, vehicle engine temperature information, and the like.

The interface 130 may serve paths to various types of external devices connected to the vehicle 100. For example, the interface 130 may be provided with a port connectable to a mobile terminal, and may be connected to a mobile terminal through the port. In this case, the interface 130 may exchange data with the mobile terminal.

Meanwhile, the interface 130 may serve as a path in which electric energy is supplied to a connected mobile terminal. When a mobile terminal is electrically connected to the interface 130, the interface 130 may supply electric energy received from the power supply unit 190 to the mobile terminal under the control of the controller 170.

The memory 140 is electrically connected to the controller 170. The memory 140 may store basic data for a unit, control data for controlling an operation of the unit, and input and output data. The memory 140 may be any of various storage devices in hardware, such as a Read Only Memory (ROM), a Random Access Memory (RAM), an Erasable and Programmable ROM (EPROM), a flash drive, and a hard drive. The memory 140 may store various data for overall operations of the vehicle 100, such as programs for processing or controlling in the controller 170.

In some implementations, the memory 140 may be integrated with the controller 170, or configured as a lower-layer component of the controller 170.

The controller 170 may provide overall control to each unit inside the vehicle 100. The controller 170 may be referred to as an Electronic Control Unit (ECU).

The power supply unit 190 may supply power needed for operating each component under the control of the controller 170. For example, the power supply unit 190 may receive power from a battery within the vehicle 100.

One or more processors and the controller 170 in the vehicle 100 may be implemented using at least one of Application Specific Integrated Circuits (ASICs), Digital Signal Processors (DSPs), Digital Signal Processing Devices (DSPDs), Programmable Logic Device (PLDs), Field Programmable Gate Arrays (FPGAs), processors, controllers, micro-controllers, microprocessors, and an electrical unit for executing other functions.

Figure 8:
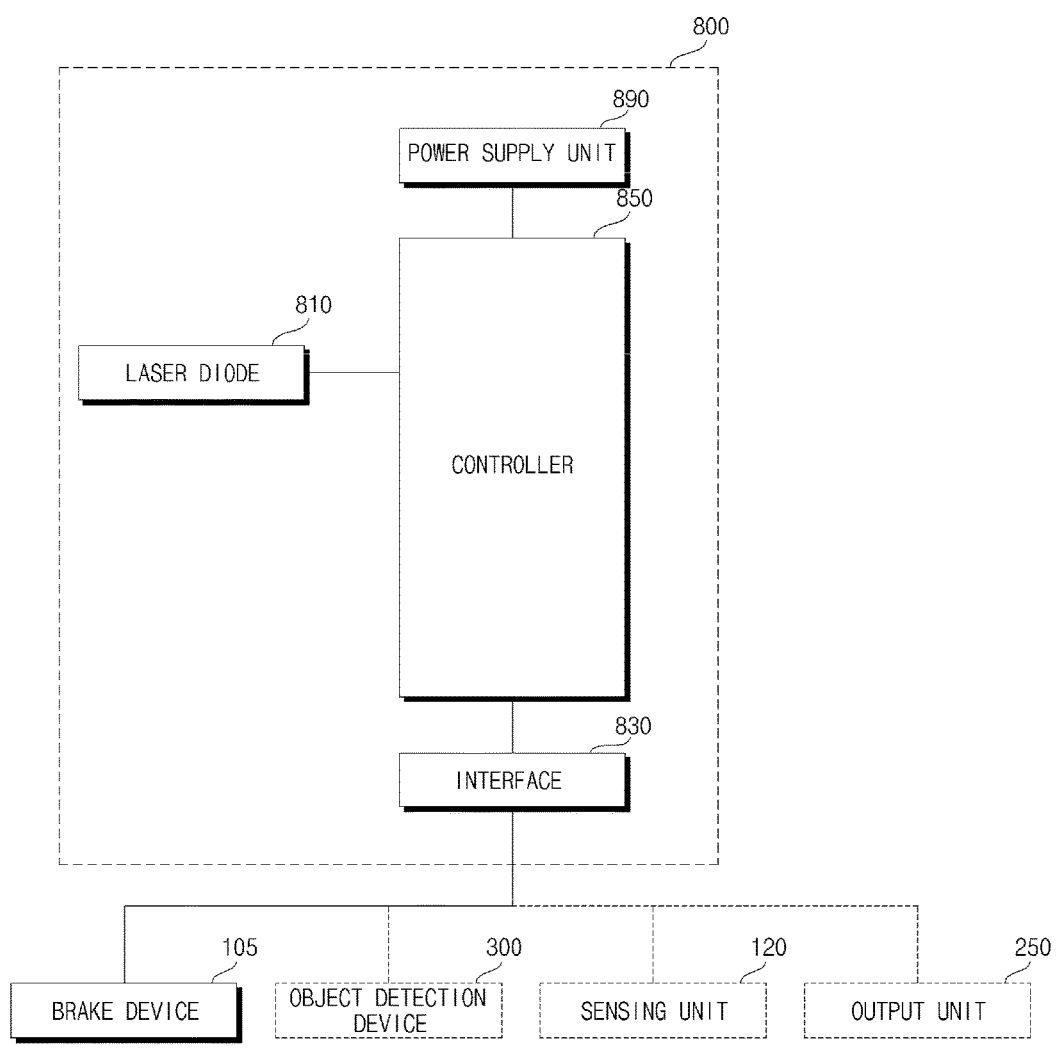
FIG. 8 is a block diagram of example component of an example lamp for a vehicle.

FIG. 8 is a block diagram of example components of an example lamp for a vehicle.

The vehicle 100 may include a lamp 800 for a vehicle.

Referring to FIG. 8, the lamp 800 for a vehicle may include a laser diode 810, an interface 830, a controller 850, and a power supply unit 890.

In some implementations, the lamp 800 for a vehicle may further include a new component in addition to the components described in the present disclosure, or may not include some of the described components.

The lamp 800 for a vehicle may include a light collecting system for collecting light emitted from the laser diode 810 into a predetermined direction. The light collecting system may include multiple lenses and phosphors.

In the present implementation, the case in which the lamp 800 for a vehicle is a headlamp of the vehicle 100 will be described by way of example, without the limitation thereto. For example, the lamp 800 for a vehicle may be any other type of lamp used in the vehicle 100, such as, for example, a fog lamp, a tail lamp, or a turn signal. Hereinafter, the case in which the lamp 800 for a vehicle is a headlamp will be described as a representative example.

The lamp 800 for a vehicle may be a pair of headlamps 800a and 800b provided on the left and right sides of the front of the vehicle 100. The lamp 800 for a vehicle may output light to the region ahead of the vehicle 100.

The laser diode 810 may be a diode that emits laser light, and may emit a predetermined wavelength of light.

The laser diode 810 may emit various colors of light depending on the wavelength thereof.

The laser diode 810 may be controlled so as to be turned on or off by supplying or interrupting power to the laser diode 810.

The amount of light output from the laser diode 810 may be controlled by adjusting the voltage and/or current supplied to the laser diode 810.

The laser diode 810 may be controlled so as to be turned off after being dimmed.

The light output of the laser diode 810 may be controlled by the controller 850.

The light output of the laser diode 810 may be controlled by the controller 850 based on brake operation information.

The brake operation information may be information including at least one of whether or not a brake is operated, the force of operation of the brake, or the brake operation time.

The light output of the laser diode 810 may be controlled by the controller 850 based on object information.

The object information may be at least one of the distance between the vehicle 100 and an object, the speed of an object relative to the vehicle 100, the absolute speed of an object, the size of an object, the type of an object, whether or not an object is a living object, or whether an object is a fixed object or a mobile object.

The light output of the laser diode 810 may be controlled by the controller 850 based on an expected time to collision (TTC).

The expected time to collision may be a value that is a result of predicting the time remaining until the vehicle 100 collides with an object.

The expected time to collision may be calculated by the processor 370 in the object detection device 300 based on the object information.

In another implementation, the expected time to collision may be calculated by the controller 850 based on the distance between an object O and the vehicle 100, the speed of the object O relative to the vehicle 100, and the acceleration of the vehicle 100.

The light output of the laser diode 810 may be controlled by the controller 850 based on whether or not an object is a living object.

The light output of the laser diode 810 may be controlled by the controller 850 based on vehicle shock information.

The shock information may be information regarding whether or not the vehicle 100 receives shocks. The shock information may include information regarding whether there is a broken part of mechanisms provided in the vehicle 100 when the vehicle 100 receives shocks.

The light output of the laser diode 810 may be controlled by the controller 850 based on shock position information.

The shock position information may be information regarding the position at which the vehicle 100 receives shocks, and may be expressed in left/right/front/rear directions and combinations thereof. The shock position information is about the incidence of shocks applied to each mechanism provided in the vehicle 100.

The light output of the laser diode 810 may be controlled by the controller 850 based on lamp information.

The lamp information may include at least one of information regarding whether or not a lamp is damaged, or information regarding the output state of light emitted from a lamp.

The light output of the laser diode 810 may be controlled by the controller 850 based on light output state information.

The light output state information may include at least one of the pattern of light emitted from a lamp, the amount of light, the color of light, or variation in the output of light in response to a control signal.

The controller 850 may perform a control operation to differentiate the light output of multiple laser diodes 810.

The interface 830 may serve as paths to various types of external devices connected to the lamp 800 for a vehicle. The interface 830 may exchange information, signals, or data with other devices included in the vehicle 100. The interface 830 may transmit received information, signals, or data to the controller 850. The interface 830 may transmit information, signals, or data, produced or processed in the controller 850, to other devices included in the vehicle 100.

The interface 830 may be the same as the interface 130. The interface 830 may be provided in the lamp 800 for a vehicle, separately from the interface 130. The interface 830 may serve as paths to various types of external devices connected to the vehicle 100.

The controller 850 may provide overall control to each unit inside the lamp 800 for a vehicle.

The controller 850 may be implemented using at least one of Application Specific Integrated Circuits (ASICs), Digital Signal Processors (DSPs), Digital Signal Processing Devices (DSPDs), Programmable Logic Device (PLDs), Field Programmable Gate Arrays (FPGAs), processors, controllers, micro-controllers, microprocessors, and electrical units for executing other functions.

The controller 850 may be the same as the controller 170 of the vehicle 100. The controller 850 may be provided in the lamp 800 for a vehicle, separately from the controller 170.

A brake device 105 may be a device used to brake the vehicle 100, and may be driven by the brake driver 622. The brake driver 622 may control the brake device 105 upon receiving a signal from the brake input device 570.

The brake device 105 may be controlled by an autonomous emergency braking system (AEBS). The brake driver 622 may control the brake device 105 upon receiving a signal from the autonomous emergency braking system.

The controller 850 may receive brake operation information from the brake device 105 via the interface 830.

The brake operation information may be information including at least one of whether or not a brake is operated, a braking level (e.g., a force of operation) of the brake, or the brake operation time.

The controller 850 may receive the brake operation information from the brake device 105.

The controller 850 may receive the brake operation information, which is produced in the brake driver 622 and is provided to the brake device 105, from the brake device 105.

According to another implementation, the controller 850 may receive the brake operation information from the brake driver 622.

According to still another implementation, the controller 850 may receive the brake operation information from the brake input device 570.

The controller 850 may receive the brake operation information, which is produced in the autonomous emergency braking system and is provided to the brake device 105, from the brake device 105.

According to another implementation, the controller 850 may receive the brake operation information from the autonomous emergency braking system.

The controller 850 may control the light output of the laser diode 810 based on the brake operation information.

The controller 850 may control at least one of the On/Off operation, the output amount of light, the output pattern of light, and the operation time of the laser diode 810 based on the brake operation information.

The lamp 800 for a vehicle provided as described above may control the laser diode 810 in advance before the lamp 800 for a vehicle is damaged due to an accident, thereby preventing a laser, which may be very harmful to the visual system of a living object, from being discharged outward from the lamp 800 for a vehicle.

The controller 850 may control the laser diode 810 so as to be turned off when a full braking operation is determined, thereby preventing a laser from being discharged outward from the lamp 800 for a vehicle when an accident occurs.

For example, a brake is operated with a maximum braking level (e.g., maximum braking force) in the full braking operation.

In some examples, the full braking operation may refer to an operation in which a brake is operated with a maximum force that the user can input.

The controller 850 may control the laser diode 810 so as to be dimmed when it is determined that a braking operation is performed with a preset value or more of force.

The preset value may be set to a value that is lower than the brake force upon a full braking operation.

For example, the controller 850 may control the laser diode 810 so as to be dimmed when it is determined that the brake force is equal to or greater than the preset value and is less than the maximum force.

For example, the controller 850 may control the brightness of the laser diode 810 so as to be reduced in inverse proportion when the brake force continuously increases to the preset value or more.

The lamp 800 for a vehicle provided as described above may control the laser diode 810 in advance before an accident occurs so that the laser diode 810 outputs light in a dimmed state for a predetermined period so as to secure the driver's view.

For example, in an accident, the laser diode can be disclosed or safety features of the lamp 800 or the vehicle can be damaged, which may result in a direct output of laser light to an outside or an uncontrolled exposure of laser light. In some examples, the controller 850 may proactively turn off the laser diode or reduce light output based on a prediction of an event such as an accident or other dangerous situations, a speed of the vehicle, or an acceleration or deceleration of the vehicle, operation of the brake, movement of a user in the vehicle, a sound inside or outside of the vehicle, etc.

The controller 850 may receive object information from the object detection device 300 via the interface 830.

The controller 850 may control the light output of the laser diode 810 based on the object information.

The object information may be information regarding at least one of the distance between the vehicle 100 and an object, the speed of an object relative to the vehicle 100, the absolute speed of an object, the size of an object, the type of an object, whether or not an object is a living object, or whether an object is a fixed object or a mobile object.

For example, the controller 850 may determine the degree of danger with respect to each of one or more objects O based on object information.

The controller 850 may control the laser diode 810 so as to be turned off at a longer distance to one object O, which is determined to have a high degree of danger, than a distance to another object O, which is determined to have a low degree of danger.

The controller 850 may determine a dangerous object based on object information, and may control the sensing unit 120 so as to sense a dangerous object first.

The controller 850 may receive object information including the expected time to collision (TTC) between the vehicle 100 and an object O.

The expected time to collision may be calculated by the processor 370 in the object detection device 300 based on the object information.

In another implementation, the expected time to collision may be calculated by the controller 850 based on the object information including the distance between the object O and the vehicle 100, the speed of the object O relative to the vehicle 100, and the acceleration of the object O.

The controller 850 may control the light output of the laser diode 810 based on the expected time to collision.

According to another implementation, the controller 850 may control the light output of the laser diode 810 based on the expected time to collision. In this case, the controller 850 may control the light output of the laser diode 810 based on the expected time to collision, instead of brake operation information.

The controller 850 may control the laser diode 810 so as to be turned off before the expected time to collision arrives.

For example, the controller 850 may control the laser diode 810 so as to be turned off when the expected time to collision (TTC) is below a preset Off time $T_{off}$.

The Off time $T_{off}$ may be a preset time.

The Off time $T_{off}$ may be set based on object information.

For example, the Off time $T_{off}$ when the object O is a mobile object may be set to be longer than the Off time $T_{off}$ when the object O is a fixed object.

The lamp 800 for a vehicle configured as described above may control the laser diode 810 in advance before the lamp 800 for a vehicle is damaged due to an accident, thereby preventing a laser, which may be very harmful to the visual system of a living object, from being discharged outward from the lamp 800 for a vehicle.

The controller 850 may control the laser diode 810 so as to be turned off after being dimmed.

The controller 850 may control the laser diode 810 so as to be dimmed from a predetermined time before the expected time to collision (TCC) arrives.

For example, the controller 850 may control the laser diode 810 so as to be dimmed when the expected time to collision TTC is equal to or greater than a preset Off time $T_{off}$ and less than a dimming time $T_{dim}$.

The dimming time $T_{dim}$ may be a preset time.

The dimming time $T_{dim}$ may be set based on object information.

For example, the dimming time $T_{dim}$ when the object O is a mobile object may be set to be longer than the diming time $T_{dim}$ when the object O is a fixed object.

The lamp 800 for a vehicle configured as described above may control the laser diode 810 in advance before an accident occurs so that the laser diode 810 outputs light in a dimmed state for a predetermined period so as to secure the driver's view.

The controller 850 may receive object information including whether or not the object O is a living object. The controller 850 may control the light output of the laser diode 810 based on whether or not the object O is a living object.

For example, the controller 850 may control the laser diode 810 so as to be dimmed to a greater amount when the object O is a living object than that when the object O is not a living object.

For example, the controller 850 may set the Off time Toff so as to be longer when the object O is a living object than that when the object O is not a living object.

For example, when the object O is a living object, the controller 850 may control the laser diode 810 so as to be dimmed in response to a braking operation performed with a preset value or more of force.

For example, when the object O is not a living object, the controller 850 may keep the laser diode 810 in an On state, rather than being dimmed, even if a braking operation is performed with a preset value or more of force.

The lamp 800 for a vehicle provided as described above may control the laser diode 810 so as to prevent, for example, the visual system of a living object from sustaining serious damage due to a laser, or to secure first the driver's view, when the object O is not a living object.

The controller 850 may control the light output of the laser diode 810 based on brake operation information of the autonomous emergency braking system.

The controller 850 may receive the brake operation information from the autonomous emergency braking system. The controller 850 may control the light output of the laser diode 810 based on the received brake operation information.

For example, the controller 850 may control the laser diode 810 so as to be turned off earlier when the autonomous emergency braking system senses the object O, compared to the case in which no object O is sensed.

For example, when the autonomous emergency braking system senses the object O, the controller 850 may control the laser diode 810 so as to be turned off even if no brake operation is sensed. In this case, the vehicle 100 may be safely braked by the autonomous emergency braking system even if the user inputs no brake signal.

The lamp 800 for a vehicle provided as described above may effectively control the laser diode 810 in advance because the light output of the laser diode 810 is automatically controlled in connection with the autonomous emergency braking system.

The controller 850 may receive shock information of the vehicle 100 from the sensing unit 120 via the interface 830.

The shock information may be information regarding whether or not the vehicle 100 receives shocks.

The shock information may include information regarding whether there is a broken part of mechanisms provided in the vehicle 100 when the vehicle 100 receives shocks.

The shock information may be produced by the sensing unit 120, which may include a collision sensor capable of sensing a collision.

The controller 850 may control the light output of the laser diode 810 based on the shock information of the vehicle 100.

For example, the controller 850 may control the laser diode 810 so as to be turned off when it is determined that the vehicle 100 receives shocks.

The shock information of the vehicle 100 may include shock position information regarding the position at which the vehicle 100 receives shocks.

The shock information is information regarding the position at which the vehicle 100 receives shocks, and the shock position information may be expressed in left/right/front/rear directions and combinations thereof.

The shock position information may be about the incidence of shocks applied to each mechanism provided in the vehicle 100.

The controller 850 may receive the shock position information from the sensing unit 120. The controller 850 may control the light output of the laser diode 810 based on the shock position information.

For example, the controller 850 may control the laser diode 810, which is disposed at the position at which the vehicle receives shocks, so as to be turned off when it is determined that the vehicle receives shocks.

In a state in which the laser diode 810 is in an Off state, the controller 850 may control the laser diode 810 so as to be turned on when it is determined that the vehicle 100 receives no shock.

For example, after controlling the laser diode 810 so as to be turned off based on brake operation information, the controller 850 may control the laser diode 810 so as to be turned on when it is determined that the vehicle 100 receives no shock, so as to secure the driver's view.

For example, after controlling the laser diode 810 so as to be turned off based on brake operation information, the controller 850 may control the laser diode 810 so as to be kept in the Off state when it is determined that the vehicle 100 receives shocks, so as to prevent a laser from being discharged outward from the lamp 800 for a vehicle.

For example, the controller 850 may control the laser diode 810, which is disposed at a position at which the vehicle receives shocks, so as to be kept in the Off state, but may control the laser diode 810, which is disposed at a position at which the vehicle receives no shocks, so as to be turned on.

For example, after controlling the laser diode 810 so as to be turned off, the controller 850 may control the laser diode 810 so as to be turned on when it is determined that the vehicle 100 receives shocks, but the lamp 800 for a vehicle including the laser diode 810 is normal.

The controller 850 may receive lamp information from the sensing unit 120 via the interface 830.

the lamp information may include at least one of information regarding whether or not a lamp is damaged, or information regarding the output state of light emitted from a lamp.

The controller 850 may control the light output of the laser diode 810 based on the lamp information.

For example, when it is determined that the lamp including the laser diode 810 is damaged based on lamp information received from the sensing unit 120, the controller 850 may control the laser diode 810 provided in a corresponding lamp so as to be turned off.

For example, the controller 850 may control the laser diode 810 so as to be turned off when it is determined, as a result of comparing reference information with lamp information received from the sensing unit 120, that a lamp including the laser diode 810 is abnormal.

The reference information may be lamp information of the laser diode 810, which is in the normal state, and may be calculated by the controller 850, based on a control signal provided from the controller 850 to the lamp 800 for a vehicle. The reference information may be pre-stored information in a memory.

Whether or not a lamp including the laser diode 810 is normal may be determined by the controller 850 based on the fact that the difference between reference information and lamp information exceeds a threshold value, as a result of comparing the reference information with the lamp information received from the sensing unit 120.

The controller 850 may receive the lamp information, including information on the output state of light emitted from the lamp 800 for a vehicle, from the camera 310 of the vehicle 100 via the interface 830.

The controller 850 may control the light output of the laser diode 810 based on light output state information.

The light output state information may include at least one of the pattern of light emitted from a lamp, the amount of light, the color of light, or variation in light output in response to a control signal.

The light output state information may be generated using a camera provided in the sensing unit 120.

The output state information of light emitted from a lamp may be generated using the camera provided in the sensing unit 120 by sensing an image of light emitted to the object O outside the vehicle.

For example, the controller 850 may control the laser diode 810 so as to be turned off when it is determined that a lamp is abnormal, as a result of comparing reference information with light output state information received from the sensing unit 120.

For example, the controller 850 may control the laser diode 810 so as to be turned off when the difference between reference information and lamp information exceeds a threshold value, as a result of comparing the preset reference information with light output state information received from the sensing unit 120.

The controller 850 may control the laser diode 810 so as to be turned off when it is determined that the pattern of light emitted from the lamp 800 for a vehicle is not the same as the pattern of light based on a produced control signal.

Information regarding the pattern of light emitted from the lamp 800 for a vehicle may be acquired from a pattern image of light emitted to an object on, for example, the road photographed by the camera provided in the sensing unit 120.

The pattern of light based on the produced control signal may be calculated by the controller 850 based on a control signal provided from the controller 850 to the laser diode 810 for controlling the output of light.

The pattern of light based on the produced control signal may be pre-stored information in the controller 850.

Whether or not the pattern of light emitted from the lamp 800 for a vehicle is the same as the pattern of light based on the produced control signal may be determined by the controller 850 based on whether or not the difference between the pattern of light emitted from the lamp 800 for a vehicle and the pattern of light based on the produced control signal exceeds a threshold value.

The lamp 800 for a vehicle provided as described above may determine whether or not a lamp is faulty, and when it is determined that a lamp is faulty, may turn off the laser diode 810 of the lamp, thereby reducing the risk of a laser being discharged outward from the lamp.

The controller 850 may control the laser diode 810 so as to be turned off when variation in the output of light emitted from the lamp 800 for a vehicle is not the same as variation in the output of light based on a produced control signal.

Variation in the output of light may include variation over time in at least one of the pattern, amount, or color of light emitted from the lamp 800 for a vehicle.

Information regarding variation in the output of light emitted from the lamp 800 for a vehicle may be produced using the camera provided in the sensing unit 120 by sensing an image of light emitted to the object O outside the vehicle.

Variation in the output of light based on the produced control signal may be calculated by the controller 850 based on a control signal provided from the controller 850 to the laser diode 810 for controlling the output of light.

For example, the controller 850 may control the laser diode 810 so as to be turned off when it is determined that the output of light emitted from the lamp 800 for a vehicle does not correspond to that in the on state even though the laser diode 810 switches from the Off state to the On state.

For example, when the controller 850 provides a control signal to the laser diode 810 so that the amount of light of the laser diode 810 varies, the controller 850 may control the laser diode 810 so as to be turned off when it is determined that variation in the amount of light emitted from the lamp 800 for a vehicle is not the same as variation in the amount of light based on the produced control signal.

For example, the controller 850 may control the laser diode 810 so as to be turned off when it is determined that the difference between variation in the amount of light emitted from the lamp 800 for a vehicle and variation in the amount of light based on the produced control signal exceeds a threshold value.

The controller 850 may control multiple laser diodes 810 differently. Controlling multiple layer diodes 810 may include controlling multiple laser diodes 810 individually.

The controller 850 may control the multiple laser diodes 810 differently based on information regarding an object O.

The controller 850 may control the multiple laser diodes 810, which are provided respectively in multiple lamps 800 for vehicles, differently.

For example, the controller 850 may control a laser diode 810, which is provided on the front of the vehicle 100, and a laser diode 810, which is provided on the rear of the vehicle, differently.

The lamp 800 for a vehicle provided as described above may prevent in advance the risk of a laser being discharged outward from the lamp 800 for a vehicle when an accident occurs and furthermore may secure the driver's view.

The controller 850 may control multiple laser diodes 810 provided in the lamp 800 for a vehicle differently.

For example, among the multiple laser diodes 810 of the lamp 800 for a vehicle, the controller 850 may control the laser diode 810, which is determined to be abnormal, so as to be turned off, and may control the laser diode 810, which is determined to be normal, so as to be turned on.

The lamp 800 for a vehicle provided as described above may control multiple laser diodes 810 differently based on whether or not the laser diodes 810 are abnormal, thereby preventing a laser from being discharged outward from the lamp and effectively securing the driver's view.

The controller 850 may control an auxiliary light source so as to be turned on when controlling the laser diode 810 so as to be turned off.

The auxiliary light source may be configured to emit light other than a laser, and may include a light output element.

The auxiliary light source may be, for example, a light emitting diode (LED).

The controller 850 configured as described above may secure the driver's view using the auxiliary light source when it becomes difficult for the driver to secure the view because the laser diode 810 is controlled so as to be turned off.

The controller 850 may control the interface 830 so as to transmit a signal for causing the vehicle output unit 250 to generate an alarm when the laser diode 810 is controlled so as to be turned off. The controller 850 provided as described above may inform the user, such as the driver, about the turning off of the laser diode 810 in advance, thereby minimizing the user inconvenience.

The power supply unit 890 may supply power required for the operation of respective components under the control of the controller 850. For example, the power supply unit 890 may receive power from, for example, a battery inside the vehicle 100.

The power supply unit 890 may be the power supply unit 190. Alternatively, the power supply unit 890 may be provided inside an operation assistance system, separately from the power supply unit 190.

FIG. 9 is a flowchart illustrating an example operation of the lamp for a vehicle.

The controller 850 may receive brake operation information from the brake device 105 via the interface 830 (S910).

The brake operation information may be information including at least one of whether or not a brake is operated, the force of operation of a brake, or the brake operation time.

The controller 850 may receive object information from the object detection device 300 via the interface 830 (S920).

The object information may be information regarding at least one of the distance between the vehicle 100 and an object, the speed of an object relative to the vehicle 100, the absolute speed of an object, the size of an object, the type of an object, whether or not an object is a living object, or whether an object is a fixed object or a mobile object.

The object information may include the expected time to collision (TTC) between the vehicle 100 and an object O.

The controller 850 may receive shock information of the vehicle 100 from the sensing unit 120 via the interface 830 (S930).

The shock information may be information regarding whether or not the vehicle 100 receives shocks. The shock information may include information regarding whether there is a broken part of mechanisms provided in the vehicle 100 when the vehicle 100 receives shocks.

The shock position information may include shock position information regarding the position at which the vehicle 100 receives shocks.

The controller 850 may receive lamp information from the sensing unit 120 via the interface 830 (S940).

The lamp information may include at least one of information regarding whether or not a lamp is damaged, or information regarding the output state of light emitted from a lamp.

the light output state information may include at least one of the pattern of light emitted from a lamp, the amount of light, the color of light, or variation in light output in response to a control signal.

The controller 850 may control the light output of the laser diode 810 based on the brake operation information (S950).

The controller 850 may also control the light output of the laser diode 810 based on the object information.

The controller 850 may also control the light output of the laser diode 810 based on the shock information of the vehicle 100.

The controller 850 may also control the light output of the laser diode 810 based on the lamp information.

The controller 850 may control an auxiliary light source so as to be turned on when the laser diode 810 is controlled so as to be turned off (S960).

The controller 850 may control the interface 830 so as to transmit a signal to the vehicle output unit 250 for generating an alarm when the laser diode 810 is controlled so as to be turned off (S970).

Figure 10A:
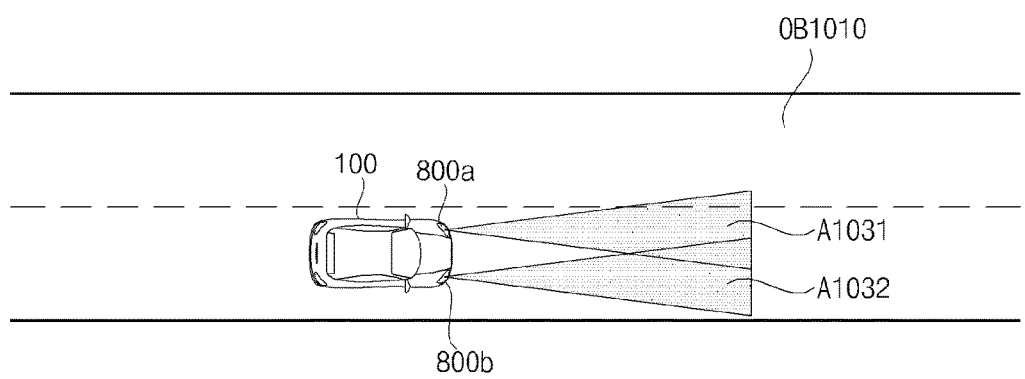
FIGS. 10A, 10B and 10C are views illustrating example operations of the lamp for a vehicle when braking is sensed.
Figure 10B:
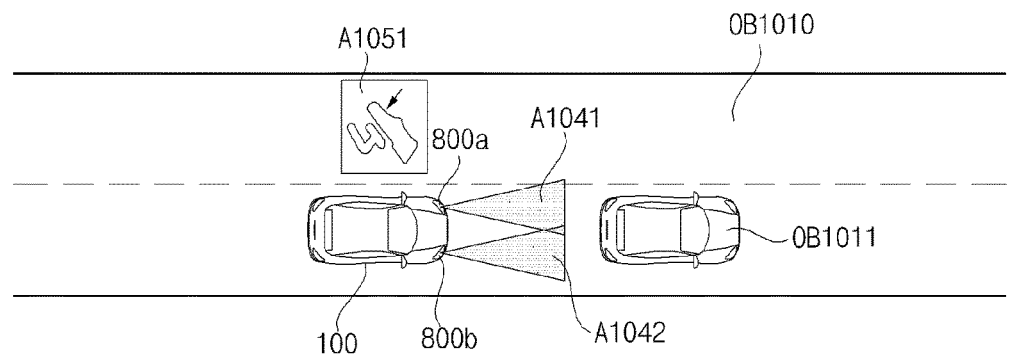
Figure 10C:
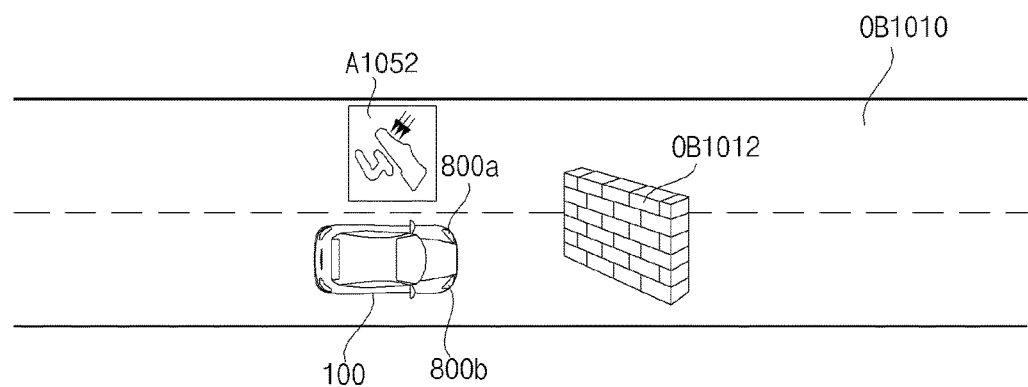

FIGS. 10A, 10B and 10C illustrate example operations of the lamp for a vehicle when braking is sensed.

The controller 850 may receive brake operation information from the brake device 105 via the interface 830.

The controller 850 may control the light output of the laser diode 810 based on the brake operation information.

The brake operation information may be information including at least one of whether or not a brake is operated, the force of operation of a brake, or the brake operation time.

The brake operation information may be information, which is generated in the brake driver 622 in response to an input to the brake input device 570 and is provided to the brake device 105.

The brake operation information may be information, which is generated in the automatic emergency braking device and provided to the brake device 105.

Referring to FIG. 10A, when the vehicle 100 is driving on a road OB1010 in the state in which no object O is present on a driving path, the controller 850 may control the laser diode 810 so that light A1031 is output from a left lamp 800*a* for a vehicle and light A1032 is output from a right lamp 800*b* for a vehicle.

Referring to FIG. 10B, when the user notices an object OB1011 and inputs a brake signal A1051 with a preset value or more of force, the controller 850 may control the laser diode 810 so that the amounts of light A1041 and A1042 output from the lamps 800*a* and 800*b* for vehicles are reduced.

Referring to FIG. 10C, when the user notices an object OB1012 and inputs a full braking signal A1052, the controller 850 may control the laser diode 810 so that the lamps 800*a* and 800*b* for vehicles are turned off.

In some implementations, the controller 850 may differently control the amount of dimming of the laser diode 810 based on the type of the object O.

For example, the controller 850 may control the laser diode 810 so as to be dimmed to a greater amount when the light emitted from the lamp 800 for a vehicle illuminates a pedestrian OB12 than that when the light emitted from the lamp 800 for a vehicle illuminates a vehicle OB11.

The lamp 800 for a vehicle provided as described above may control the laser diode 810 in advance before the lamp 800 for a vehicle is damaged due to an accident, thereby preventing a laser, which may be very harmful to the visual system of a living object, from being discharged outward from the lamp 800 for a vehicle.

Figure 11A:
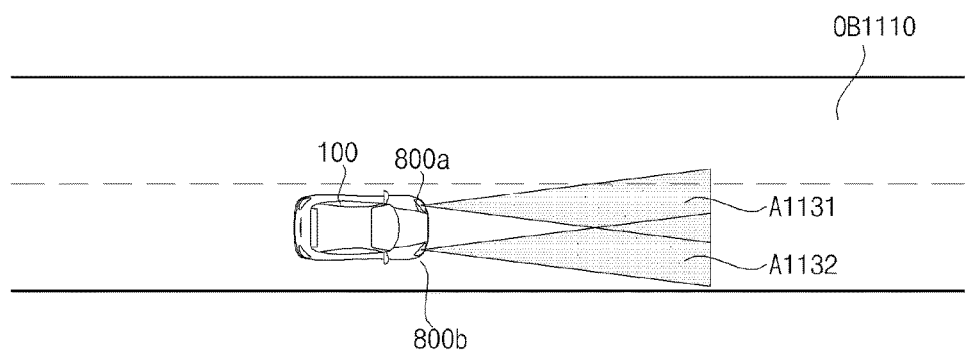
FIGS. 11A, 11B and 11C are views illustrating example operations of the lamp for a vehicle based on an expected time to collision (TTC).
Figure 11B:
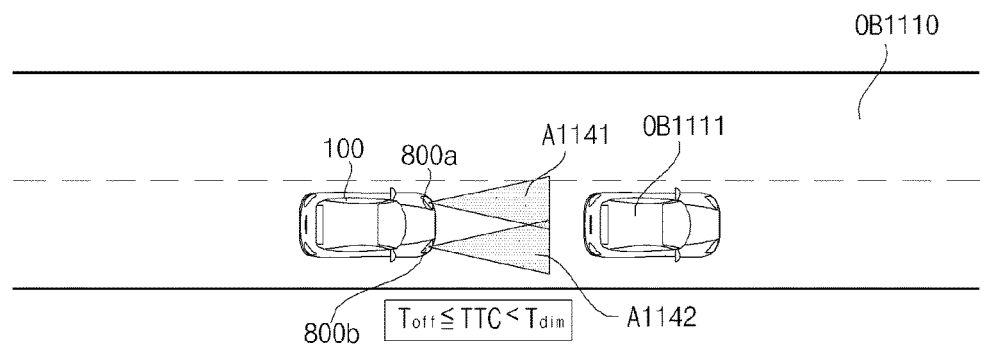
Figure 11C:
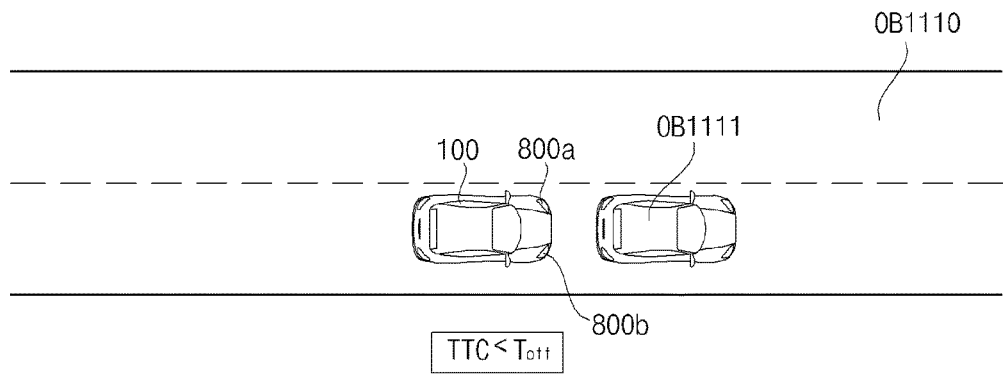

FIGS. 11A, 11B and 11C illustrate example operations of the lamp for a vehicle depending on an expected collision time.

The controller 850 may receive object information from the object detection device 300 via the interface 830.

The object information may include the expected time to collision (TTC) between the vehicle 100 and an object OB1111.

The controller 850 may control the light output of the laser diode 810 based on the expected time to collision.

Referring to FIG. 11A, when the vehicle 100 is driving on a road OB1110 in the state in which no object O is present on a driving path, the controller 850 may control the laser diode 810 so that light A1131 is output from the left lamp 800a for a vehicle and light A1132 is output from the right lamp 800b for a vehicle.

Referring to FIG. 11B, when the expected time to collision (TTC) is equal to or greater than a preset Off time $T_{off}$ and is less than a dimming time $T_{dim}$, the controller 850 may control the laser diode 810 so that the amounts of light A1141 and A1142 output from the lamps 800a and 800b for vehicles are reduced.

The Off time $T_{off}$ may be a preset time.

The Off time $T_{off}$ may be set based on object information.

For example, the Off time $T_{off}$ when the object O is a mobile object may be set to be longer than the Off time $T_{off}$ when the object O is a fixed object.

For example, the Off time $T_{off}$ when the object O is a living object may be set to be longer than the Off time $T_{off}$ when the object O is an inanimate object.

The dimming time $T_{dim}$ may be a preset time.

The dimming time $T_{dim}$ may be set based on object information.

For example, the dimming time $T_{dim}$ when the object O is a mobile object may be set to be longer than the diming time $T_{dim}$ when the object O is a fixed object.

For example, the dimming time $T_{dim}$ when the object O is a living object may be set to be longer than the diming time $T_{dim}$ when the object O is an inanimate object.

Referring to FIG. 11C, when the expected time to collision (TCC) is less than the preset Off time $T_{off}$, the controller 850 may control the laser diode 810 so that the lamps 800a and 800b for vehicles are turned off.

For example, when the Off time $T_{off}$ is 2 seconds and the dimming time $T_{dim}$ is 7 seconds, the controller 850 may control the laser diode 810 so as to be gradually dimmed within a period during which the expected time to collision is less than 7 seconds and is equal to or greater than 2 seconds, and thereafter may control the laser diode 810 so as to be turned off when the expected time to collision is less than 2 seconds.

The lamp 800 for a vehicle provided as described above may control the laser diode 810 in advance before the lamp 800 for a vehicle is damaged due to an accident, thereby preventing a laser, which may be very harmful to the visual system of a living object, from being discharged outward from the lamp 800 for a vehicle.

Figure 12A:
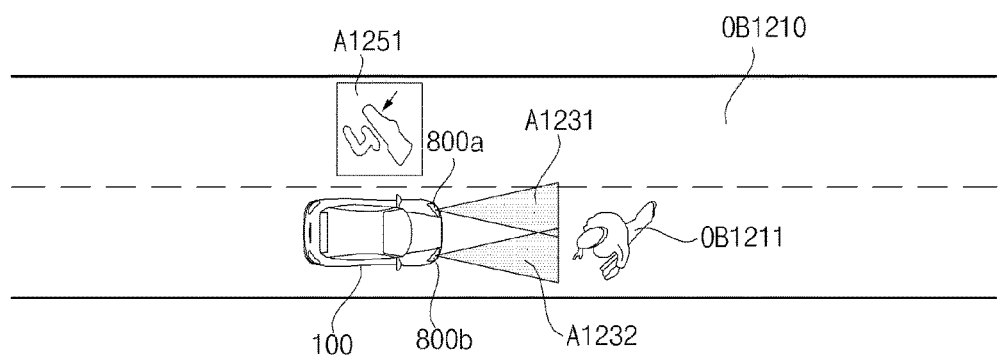
FIGS. 12A and 12B are views illustrating example operations of the lamp for a vehicle depending on the types of objects.
Figure 12B:
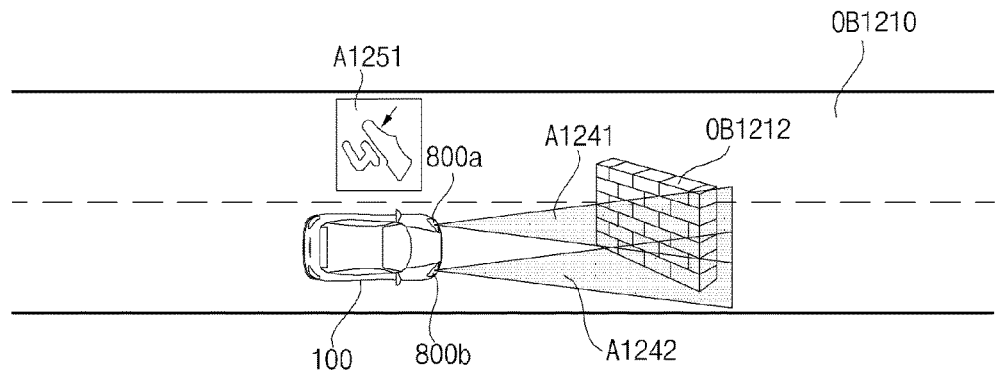

FIGS. 12A and 12B illustrate example operations of the lamp for a vehicle depending on the types of objects.

The controller 850 may receive brake operation information from the brake device 105 via the interface 830.

The brake operation information may be information including at least one of whether or not a brake is operated, the force of operation of a brake, or the brake operation time.

The controller 850 may receive object information from the object detection device 300 via the interface 830.

The object information may include information regarding whether or not the object O is a living object.

The controller 850 may control the light output of the laser diode 810 based on the brake operation information.

The controller 850 may also control the light output of the laser diode 810 based on whether or not the object O is a living object.

Referring to FIG. 12A, when it is determined that a braking operation A1251 is performed with a preset value or more of force and that the object O is a pedestrian OB1211, the controller 850 may control the laser diode 810 so that the amounts of light A1231 and A1232 output from the lamps 800a and 800b are reduced.

At this time, the controller 850 may set the amount of dimming of the laser diode 810 based on information regarding the distance to the pedestrian OB1211.

Referring to FIG. 12B, when it is determined that the braking operation A1251 is performed with a preset value or more of force and that the object O is an inanimate object OB1212, the controller 850 may control the laser diode 810 so that the amounts of light A1241 and A1242 output from the lamps 800a and 800b are maintained, rather than being reduced.

For example, when it is determined that the object O is the inanimate object OB1212, the controller 850 may control the laser diode 810 so as not to be dimmed even if a braking operation is performed with a preset value or more of force, and may control the laser diode 810 so as to be turned off when a full braking operation is performed.

The lamp 800 for a vehicle provided as described above may prevent, for example, the visual system of a living object from sustaining serious damage due to a laser, but may control the laser diode 810 so as to secure first the driver's view when the object is not a living object.

Figure 13A:
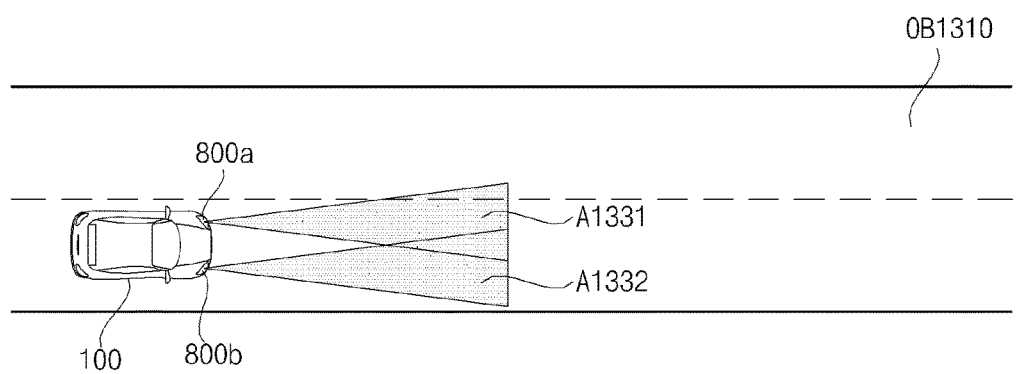
FIGS. 13A and 13B are views illustrating example operations of the lamp for a vehicle based on an automatic emergency braking.
Figure 13B:
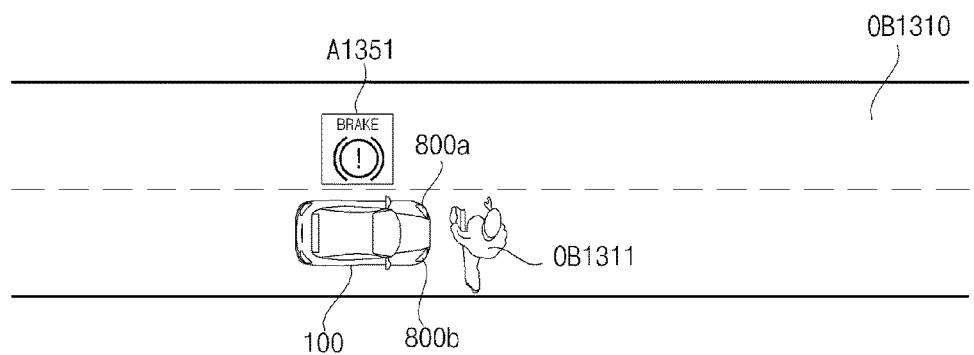

FIGS. 13A and 13B illustrate example operations of the lamp for a vehicle upon automatic emergency braking.

The controller 850 may receive brake operation information from the brake device 105 via the interface 830.

The brake operation information may be produced in an autonomous emergency braking system and may be provided to the brake device 105.

The controller 850 may control the light output of the laser diode 810 based on the brake operation information.

The controller 850 may also control the light output of the laser diode 810 based on brake operation information A1351 of the autonomous emergency braking system.

For example, the controller 850 may control the laser diode 810 differently when the autonomous emergency braking system senses an object O and when the autonomous emergency braking system senses no object O.

For example, in the case 1351 in which the autonomous emergency braking system senses an object O, since the vehicle 100 may be automatically braked even if the driver does not notice the object O, the controller 850 may control the laser diode 810 so as to be turned off.

For example, when the autonomous emergency braking system senses no object O, the driver needs to notice the object O and directly brake the vehicle 100. Therefore, when it is determined that a braking operation is performed with a preset value or more of force, the controller 850 may control the laser diode 810 so as to be dimmed.

For example, when it is determined that a braking operation is performed at a preset value or more of force, the controller 850 may control the laser diode 810 so as to be dimmed to a greater amount in the case A1351 in which the autonomous emergency braking system senses an object O than in the case where the autonomous emergency braking system senses no object O.

The lamp 800 for a vehicle configured as described above may more safely control the laser diode 810 when the autonomous emergency braking system secures safe braking.

FIGS. 14A, 14B, 14C and 14D illustrate example operations of the lamp for a vehicle when no collision is sensed after turn-off control.

The controller 850 may receive brake operation information from the brake device 105 via the interface 830.

The brake operation information may be produced in an autonomous emergency braking system and may be provided to the brake device 105.

The controller 850 may receive shock information of the vehicle 100 from the sensing unit 120 via the interface 830.

The shock information may be information regarding whether or not the vehicle 100 receives shocks.

The controller 850 may control the light output of the laser diode 810 based on the brake operation information.

The controller 850 may also control the light output of the laser diode 810 based on the shock information of the vehicle 100.

Figure 14A:
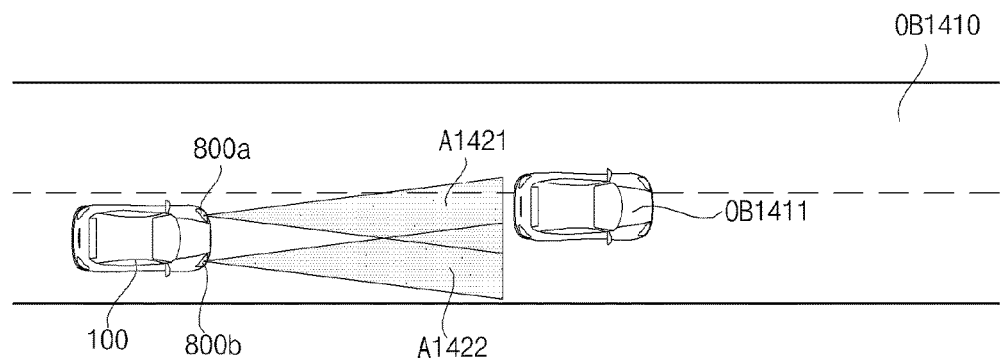
FIGS. 14A, 14B, 14C and 14D are views illustrating example operations of the lamp for a vehicle when no collision is sensed after a turn-off control.

Referring to FIG. 14A, when the vehicle 100 is driving on a road OB1410, the controller 850 may control the laser diode 810 so that the lamps 800a and 800b emit light A1421 and A1422.

Figure 14B:
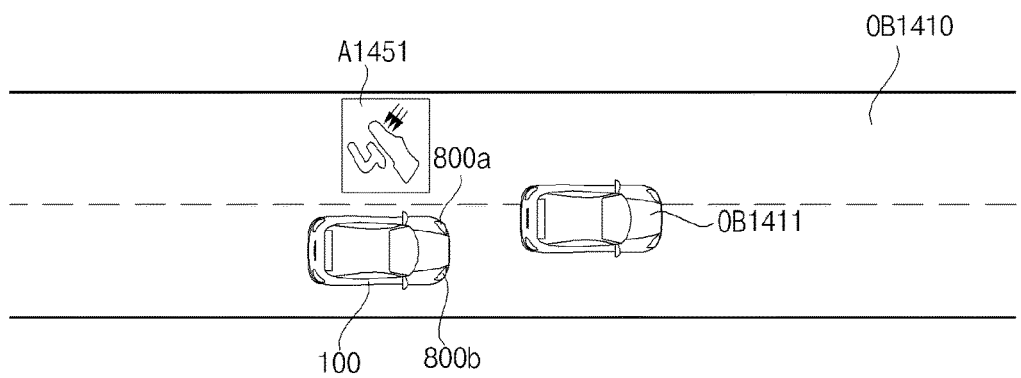

Referring to FIG. 14B, when it is determined that a full braking operation A1451 is performed, the controller 850 may control the laser diode 810 so as to be turned off.

Figure 14C:
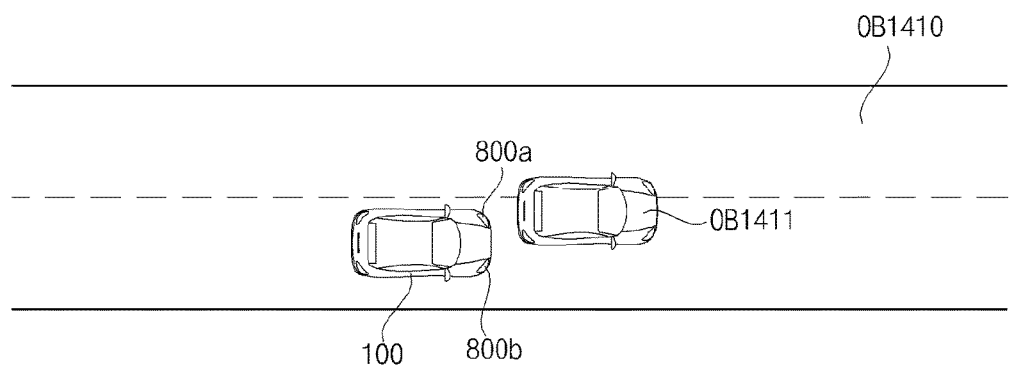

FIG. 14C illustrates an example case in which the vehicle 100 stops without colliding with another vehicle OB1411.

Figure 14D:
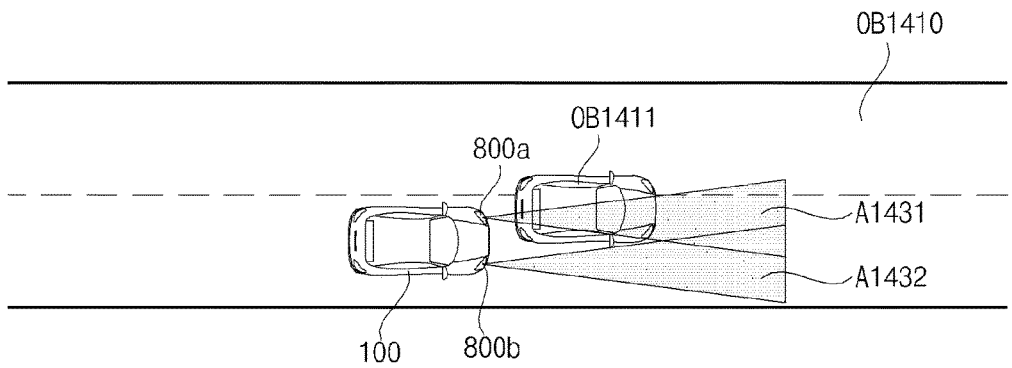

Referring to FIG. 14D, when it is determined that the vehicle 100 receives no shock based on the shock information received from the sensing unit 120, the controller 850 may control the laser diode 810 so as to be turned on.

When the laser diode 810 is controlled so as to be turned on because the vehicle 100 receives no shock, the controller 850 may also control the laser diode 810 based on object information.

For example, when an object O is the pedestrian OB12, the controller 850 may control the laser diode 810 so as to be turned on and dimmed.

For example, when the distance to the object O is less than a preset value, the controller 850 may control the laser diode 810 so as to be turned on and dimmed.

For example, when the distance to the object O is less than a preset value, the controller 850 may control the laser diode 810 so as to be kept in the Off state.

The lamp 800 for a vehicle configured as described above may control the laser diode 810 so as to rapidly secure the driver's view when there is no risk of a laser being directly discharged outwards.

Figure 15A:
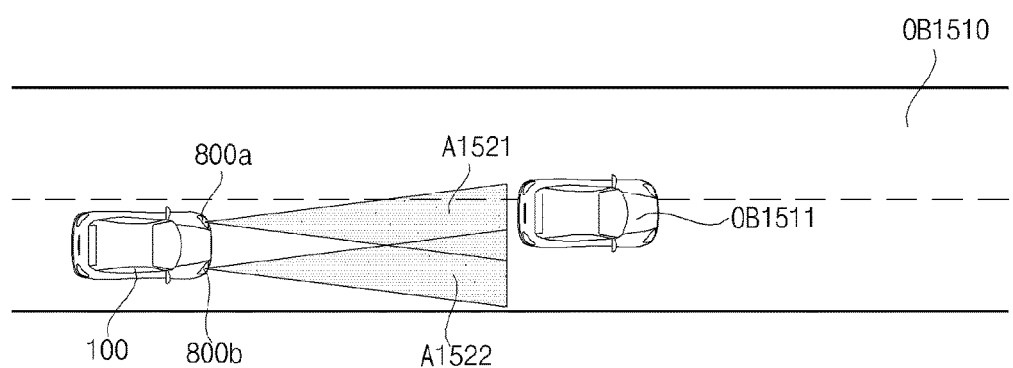
FIGS. 15A, 15B, 15C and 15D are views illustrating example operations of the lamp for a vehicle when a collision is sensed after a turn-off control.
Figure 15B:
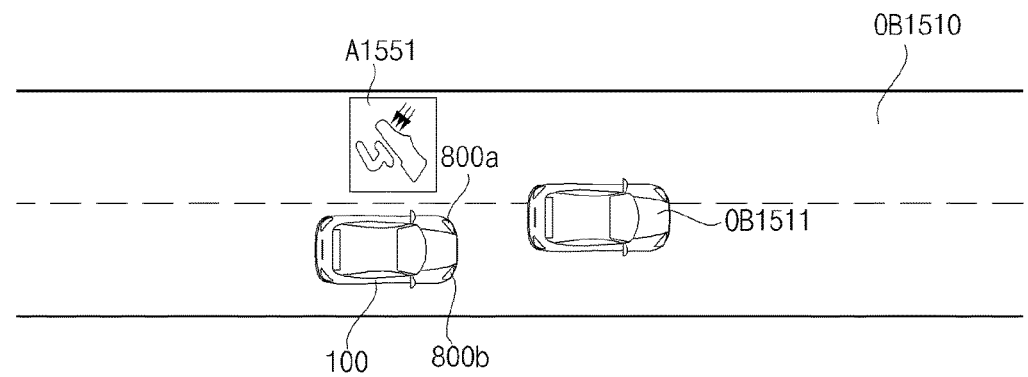
Figure 15C:
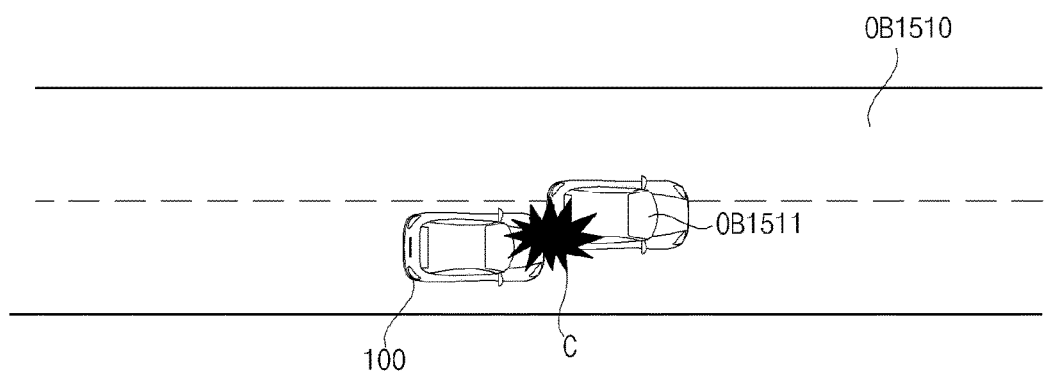

FIGS. 15A, 15B, 15C and 15C illustrate example operations of the lamp for a vehicle when a collision is sensed after turn-off control.

The controller 850 may receive brake operation information from the brake device 105 via the interface 830.

The brake operation information may be produced in an autonomous emergency braking system and may be provided to the brake device 105.

The controller 850 may receive shock information of the vehicle 100 from the sensing unit 120 via the interface 830.

The shock information may be information regarding whether or not the vehicle 100 receives shocks.

The shock information may include shock position information regarding the position at which the vehicle 100 receives shocks.

The controller 850 may control the light output of the laser diode 810 based on the brake operation information.

The controller 850 may also control the light output of the laser diode 810 based on the shock information of the vehicle 100.

Referring to FIG. 15A, when the vehicle 100 is driving on a road OB1510, the controller 850 may control the laser diode 810 so that the lamps 800a and 800b emit light A1521 and A1522.

Referring to FIG. 15B, when it is determined that a full braking operation A1551 is performed, the controller 850 may control the laser diode 810 so as to be turned off.

FIG. 15C illustrates an example case in which a collision between the vehicle 100 and another vehicle OB1511 occurs, and illustrates a collision C between the left front side of the vehicle 100 and the rear side of the other vehicle OB1511.

Figure 15D:
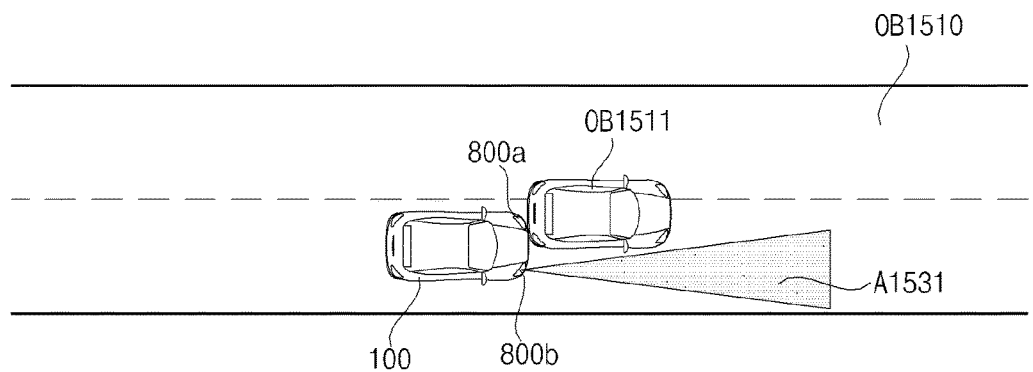

Referring to FIG. 15D, the controller 850 may control the laser diode 810 based on the shock information received from the sensing unit 120 so that the left lamp 800a for a vehicle, which is determined to be receiving shocks, is kept in the Off state and so that the right lamp 800b for a vehicle, which is determined not to be receiving shocks, is turned on so as to emit light A1531.

The lamp 800 for a vehicle configured as described above may control the laser diode 810 so that the lamp 800, which is not damaged even when the vehicle 100 receives shocks, is rapidly turned on so as to rapidly secure the driver's view.

Figure 16A:
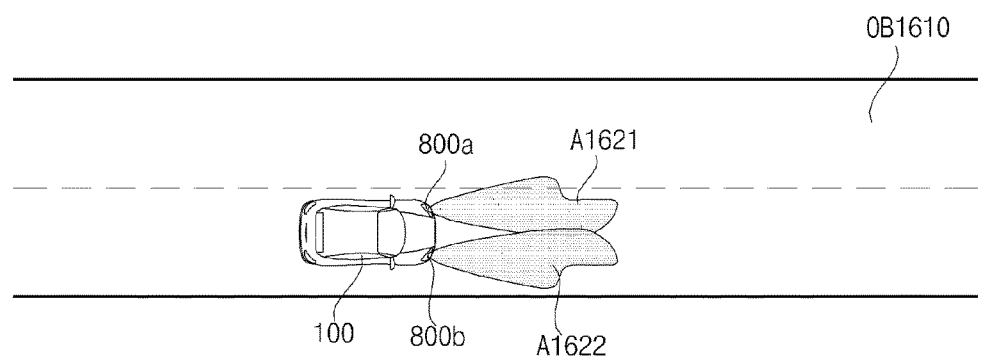
FIGS. 16A and 16B are views illustrating an example operation of the lamp for a vehicle based on optical patterns.
Figure 16B:
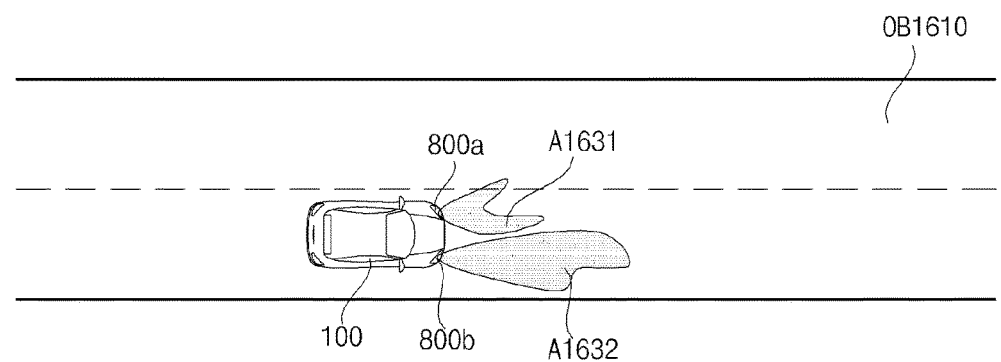

FIGS. 16A and 16B illustrate example operations of the lamp for a vehicle depending on optical patterns.

The controller 850 may receive lamp information from the sensing unit 120 via the interface 830.

The lamp information may include at least one of information regarding whether or not a lamp is damaged, or information regarding the output state of light emitted from a lamp.

The light output state information may include at least one of the pattern of light emitted from a lamp, the amount of light, the color of light, or variation in light output in response to a control signal.

FIG. 16A illustrates patterns A1521 and A1522 of light emitted from the lamp 800 for a vehicle, which is normal, to a road OB1610.

The controller 850 may receive, from the sensing unit 120, information regarding patterns A1621 and A1622 of light emitted from the lamps 800a and 800b for vehicles to a road OB1611.

Referring to FIG. 16B, the controller 850 may control the laser diode 810 so as to be turned off when it is determined that patterns A1631 and A1632 of light emitted from the lamp 800 for a vehicle are not the same as the patterns A1621 and A1622 of light based on a produced control signal.

The patterns A1631 and A1632 of light emitted from the lamp 800 for a vehicle are patterns of light emitted to an actual road OB1610 as information received from the sensing unit 120.

The patterns A1621 and A1622 of light based on the produced control signal may be calculated by the controller 850 based on a control signal provided from the controller 850 to the laser diode 810 in order to control the light output.

The patterns A1621 and A1622 of light based on the produced control signal may be pre-stored information in the controller 850.

For example, the patterns A1621 and A1622 of light based on the produced control signal may be pre-stored information regarding the patterns A1521 and A1522 of light emitted from the lamp 800 for a vehicle, which is normal, to the road OB1610 in a memory.

For example, the controller 850 may compare the patterns A1631 and A1632 of light emitted from the lamp 800 for a vehicle with the patterns A1621 and A1622 of light based on the produced control signal, and may control the laser diode 810 of the left lamp 800a for a vehicle so as to be turned off when it is determined that the difference therebetween exceeds a threshold value.

Meanwhile, although not illustrated, the controller 850 may compare the patterns A1631 and A1632 of light emitted from the lamp 800 for a vehicle with the patterns A1621 and A1622 of light based on the produced control signal with respect to at least one of the amount of light, the color of light, or variation in the output of light in response to a control signal, and may control the laser diode 810 of the left lamp 800a for a vehicle so as to be turned off when it is determined that the difference therebetween exceeds a threshold value.

The lamp 800 for a vehicle provided as described above may determine whether or not the lamp is faulty, and may turn off the laser diode 810 of the lamp when it is determined that the lamp is faulty, thereby reducing the risk of a laser being discharged outward from the lamp.

Figure 17:
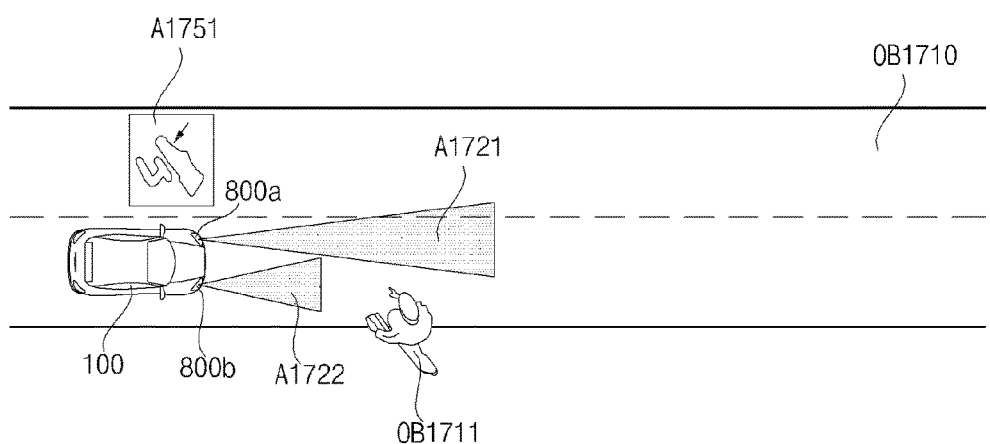
FIG. 17 is a view illustrating example control of multiple laser diodes in the lamp for a vehicle.

FIG. 17 illustrates an example control of multiple laser diodes in the lamp for a vehicle.

The controller 850 may receive brake operation information from the brake device 105 via the interface 830.

The brake operation information may be produced in an autonomous emergency braking system and may be provided to the brake device 105.

The controller 850 may receive object information from the object detection device 300 via the interface 830.

The object information may be information regarding at least one of the distance between the vehicle 100 and an object, the speed of an object relative to the vehicle 100, the absolute speed of an object, the size of an object, the type of an object, whether or not an object is a living object, or whether an object is a fixed object or a mobile object.

The controller 850 may control the light output of the laser diode 810 based on the brake operation information.

The controller 850 may also control the light output of the laser diode 810 based on the object information.

The controller 850 may control multiple laser diodes 810 differently.

The multiple laser diodes 810 may be respectively provided in multiple lamps 800 for vehicles.

Referring to FIG. 17, when a braking operation A1751 is performed with a preset value or more of force, the controller 850 may control the laser diode 810 so that only the lamp 800b for a vehicle, which emits light toward an object OB1711, among the multiple lamps 800a and 800b for vehicles, is dimmed.

For example, when it is determined that the vehicle 100 receives shocks based on shock information received from the sensing unit 120, the controller 850 may control the laser diode 810 so that only the lamp 800 for a vehicle, which is at the position at which the vehicle 100 receives shocks, among multiple lamps 800 for vehicles, is turned off.

For example, the controller 850 may control the laser diode 810 so that only the lamp 800 for a vehicle, which is determined to be abnormal, among multiple lamp 800 for vehicles is turned off, based on lamp information received from the sensing unit 120.

The lamp 800 for a vehicle configured as described above may safely control the multiple laser diodes 810 so as to secure the driver's view effectively.

The disclosure described above may be realized as a computer-readable code in a medium in which programs are recorded. The computer-readable medium may include all types of recording device in which data, which may be read by a computer system, are stored. Examples of the computer-readable medium may include a hard disk drive (HDD), solid state disk (SSD), silicon disk drive (SDD), ROM, RAM, CD-ROM, magnetic tape, floppy disc, or optical data storage device. In addition, the computer-readable medium may be realized in a carrier wave (e.g., transmission via the Internet). In addition, the computer may include the controller 180 of the terminal. Thus, the above detailed description should not be construed as being limitative in all terms, but should be considered as being illustrative. The scope of the disclosure should be determined by the rational analysis of the accompanying claims, and all changes within the equivalent range of the disclosure are included in the scope of the disclosure.

As is apparent from the above description, according to the implementations of the present disclosure, one or more effects as follows may be provided.

First, by safely controlling a laser lamp before an accident occurs, it may be possible to prevent damage to the visual system of a living object including a human due to the leakage of direct laser light.

Second, by controlling the dimming of a laser diode and controlling the output of light depending on whether or not an object is a living object, it may be possible to safely control a laser lamp before an accident occurs and to secure the driver's view effectively.

Third, it may be possible to minimize the inconvenience of a user such as, for example, a driver, when controlling the light output of a laser diode by controlling the dimming of the laser diode.

Fourth, by controlling a lamp for a vehicle so as to be turned off and then turned on when no accident occurs, it may be possible to safely control the lamp for a vehicle and to increase the convenience of a user.

The effects of the present disclosure are not limited to the objects as mentioned above, and other unmentioned effects will be clearly understood by those skilled in the art from the following description of claims.

What is claimed is:

1. A lamp for a vehicle comprising:
a laser diode configured to output light;
an interface configured to communicate with a brake device of the vehicle; and
at least one processor coupled to the interface and configured to:
receive brake operation information from the brake device via the interface, and
control a light output of the laser diode based on the brake operation information, wherein the at least one processor is further configured to:
  receive object information from an object detection device via the interface, and
  control the light output of the laser diode based on the object information.

2. The lamp according to claim 1, wherein the at least one processor is further configured to:
  based on the brake operation information, determine whether the brake device has performed a full braking operation; and
  based on a determination that the brake device has performed the full braking operation, control the laser diode to reduce an output of the light.

3. The lamp according to claim 1, wherein the at least one processor is further configured to:
  based on the brake operation information, determine whether a braking operation is performed with a braking level that is greater than or equal to a threshold level; and
  based on a determination that the braking operation is performed with the braking level that is greater than or equal to the threshold level, control the laser diode to dim the light output.

4. The lamp according to claim 1, wherein the laser diode comprises a plurality of laser diodes, each laser diode being configured to output light, and
  wherein the at least one processor is further configured to, based on the brake operation information, control a first laser diode among the plurality of laser diodes differently from a second laser diode among the plurality of laser diodes.

5. The lamp according to claim 1, wherein the object information includes an estimated time to collision (TTC) between the vehicle and an object, and
  wherein the at least one processor is further configured to control the light output of the laser diode based on the TTC.

6. The lamp according to claim 5, wherein the at least one processor is further configured to control the laser diode to reduce the light output within the TTC.

7. The lamp according to claim 6, wherein the at least one processor is further configured to control the laser diode to turn off the light output after reducing the light output within the TTC.

8. The lamp according to claim 1, wherein the object information includes information about whether an object is a living object, and
  wherein the at least one processor is further configured to control the light output of the laser diode based on whether the object is the living object.

9. The lamp according to claim 1, wherein the vehicle further comprises an autonomous emergency braking system (AEBS), and
  wherein the at least one processor is further configured to reduce the light output of the laser diode based on the brake operation information received from the AEBS.

10. The lamp according to claim 1, wherein the vehicle further includes a sensing unit coupled to the interface and configured to sense vehicle shock information, and
  wherein the at least one processor is further configured to:
    receive the vehicle shock information from the sensing unit via the interface, and
    control the light output of the laser diode based on the vehicle shock information.

11. The lamp according to claim 10, wherein the vehicle shock information includes vehicle shock position information corresponding to a position at which a vehicle has received a shock, and
  wherein the at least one processor is further configured to control the light output of the laser diode based on the vehicle shock position information.

12. The lamp according to claim 10, wherein the at least one processor is further configured, based on the laser diode being in a turned off state, to:
  determine whether the vehicle has received a shock based on the vehicle shock information; and
  control the laser diode to be turned on based on a determination that the vehicle received no shock.

13. The lamp according to claim 1, wherein the vehicle further includes a sensing unit coupled to the interface, and
  wherein the at least one processor is further configured to:
    receive lamp information from the sensing unit via the interface; and
    control the light output of the laser diode based on the lamp information.

14. The lamp according to claim 13, wherein the sensing unit includes a camera configured to capture light emitted from the lamp,
  wherein the lamp information includes information about a state of light output that is emitted from the lamp and captured by the camera of the sensing unit, and
  wherein the at least one processor is further configured to control the light output of the laser diode based on the information about the state of the light output.

15. The lamp according to claim 14, wherein the at least one processor is further configured to:
  determine whether a detected pattern of light emitted from the lamp corresponds to an expected pattern of light based on a control signal produced by the at least one processor; and
  control the laser diode to reduce the light output based on a determination that the detected pattern of light emitted from the lamp deviates from the expected pattern of light.

16. The lamp according to claim 14, wherein the at least one processor is further configured to:
  determine whether a detected variation in an output of light emitted from the lamp corresponds to an expected variation in the output of light based on a control signal produced by the at least one processor; and
  control the laser diode to reduce off the light output based on a determination that the detected variation in the output of light emitted from the lamp deviates from the expected variation in the output of light.

17. A vehicle comprising:
  a plurality of wheels;
  a power source configured to drive a rotation of at least one of the plurality of wheels; and
  a lamp comprising:
    a laser diode configured to output light,
    an interface configured to communicate with a brake device of the vehicle, and
    at least one processor coupled to the interface and configured to:
      receive brake operation information from the brake device via the interface, and
      control a light output of the laser diode based on the brake operation information,
    wherein the at least one processor is further configured to:

receive object information from an object detection device via the interface, and
control the light output of the laser diode based on the object information.

18. The lamp according to claim 1, wherein the at least one processor is further configured to control the interface to transmit a signal to an output unit of the vehicle, the output unit being configured to, in response to reception of the signal from the at least one processor, generate an alarm based on the laser diode being controlled to reduce the light output.

19. A lamp for a vehicle comprising:
a laser diode configured to output light;
an interface configured to communicate with a brake device of the vehicle; and
at least one processor coupled to the interface and configured to:
receive brake operation information from the brake device via the interface, and
control a light output of the laser diode based on the brake operation information,
wherein the at least one processor is further configured to:
based on the brake operation information, determine whether a braking operation is performed with a braking level that is greater than or equal to a threshold level, and
based on a determination that the braking operation is performed with the braking level that is greater than or equal to the threshold level, control the laser diode to dim the light output.

* * * * *